(12) United States Patent
Riedelsheimer et al.

(10) Patent No.: US 9,978,284 B2
(45) Date of Patent: May 22, 2018

(54) METHOD AND APPARATUS FOR GENERATING VEHICLE MANEUVER PLANS

(71) Applicant: HERE Global B.V., Veldhoven (NL)

(72) Inventors: Norbert Riedelsheimer, Berlin (DE); Alexander Kroller, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 0 days. days.

(21) Appl. No.: 14/732,233

(22) Filed: Jun. 5, 2015

(65) Prior Publication Data

US 2016/0358479 A1   Dec. 8, 2016

(51) Int. Cl.
| | |
|---|---|
| G01C 21/34 | (2006.01) |
| G08G 1/00 | (2006.01) |
| G08G 1/01 | (2006.01) |
| H04L 29/08 | (2006.01) |

(52) U.S. Cl.
CPC .............. G08G 1/22 (2013.01); G01C 21/34 (2013.01); G08G 1/0112 (2013.01); G08G 1/0145 (2013.01); H04L 67/12 (2013.01)

(58) Field of Classification Search
CPC ........ G06Q 10/00; G01C 21/26; G01C 21/34; G08G 1/00; G08G 1/22; H04L 29/08; H04L 67/122
See application file for complete search history.

(56) References Cited

U.S. PATENT DOCUMENTS

| | | | |
|---|---|---|---|
| 8,374,594 B2 | 2/2013 | Yamato et al. | |
| 2002/0107634 A1 | 8/2002 | Luciani | |
| 2004/0068393 A1 | 4/2004 | Lawrence | |
| 2004/0228348 A1* | 11/2004 | Caves | H04L 12/5601 370/395.3 |
| 2007/0288163 A1* | 12/2007 | Meyer | G01C 21/26 701/431 |
| 2009/0073912 A1* | 3/2009 | Bauchot | H04L 12/1854 370/312 |

(Continued)

OTHER PUBLICATIONS

Mir et al., "LTE and IEEE 802.11p for vehicular networking: a performance evaluation", May 30, 2014, EURASIP Journal on Wireless Communications and Networking, 2014, 15 Pages.

(Continued)

*Primary Examiner* — Yonel Beaulieu
*Assistant Examiner* — Martin A Weeks
(74) *Attorney, Agent, or Firm* — Ditthavong & Steiner, P.C.

(57) ABSTRACT

An approach is provided for generating maneuver plans for one or more vehicles. A maneuvering platform processes location information, context information, or a combination thereof associated with a vehicle to determine at least one cell of a wireless communication network associated with a current location of the vehicle. The maneuvering platform further assigns the vehicle to a cluster associated with the at least one cell based on an establishment of a communication link between an access node associated with the vehicle and the at least one cell, an association between the current location of the vehicle, the access node associated with the vehicle, or a combination thereof and a geographic coverage range of the at least one cell or a combination thereof.

20 Claims, 11 Drawing Sheets

(56) References Cited

U.S. PATENT DOCUMENTS

| | | | |
|---|---|---|---|
| 2009/0287527 A1* | 11/2009 | Kolb | G06Q 10/00 |
| | | | 705/13 |
| 2010/0216498 A1* | 8/2010 | Mintah | H04L 45/04 |
| | | | 455/507 |
| 2010/0254282 A1 | 10/2010 | Chan et al. | |
| 2010/0285772 A1 | 11/2010 | Colonna et al. | |
| 2014/0057598 A1* | 2/2014 | Steer | H04W 12/06 |
| | | | 455/411 |
| 2014/0376777 A1* | 12/2014 | Churchill | G01C 21/26 |
| | | | 382/104 |
| 2015/0100225 A1* | 4/2015 | Fuehrer | G08G 1/096716 |
| | | | 701/118 |

OTHER PUBLICATIONS

Rewadkar et al., "Least-Congested Route Estimation Using GPS Equipped Vehicles in Urban Road Networks", International Journal of Computer Engineering and Technology (IJCET), vol. 5, Issue 4, Apr. 2014, pp. 86-94.
IBM SoftwareTelecommunications, "Smarter wireless networks", Feb. 2013, retrieved on Sep. 8, 2015 from http://www-935.ibm.com/services/multimedia/Smarter_wireless_networks.pdf, 8 pages.
Nokia, "New Mobile Edge Computing initiative for Liquid Applications", Oct. 17, 2014, retrieved on Sep. 8, 2015 from http://company.nokia.com/en/news/press-releases/2014/10/17/new-mobile-edge-computing-initiative-for-liquid-applications, pp. 1-3.
Notification of Transmittal of the International Search Report and the Written Opinion of the International Searching Authority, or the Declaration; International Search Report, and Written Opinion of the International Searching Authority for International Patent Application No. PCT/IB2016/000863, dated Oct. 7, 2016, 19 pages.

* cited by examiner

100

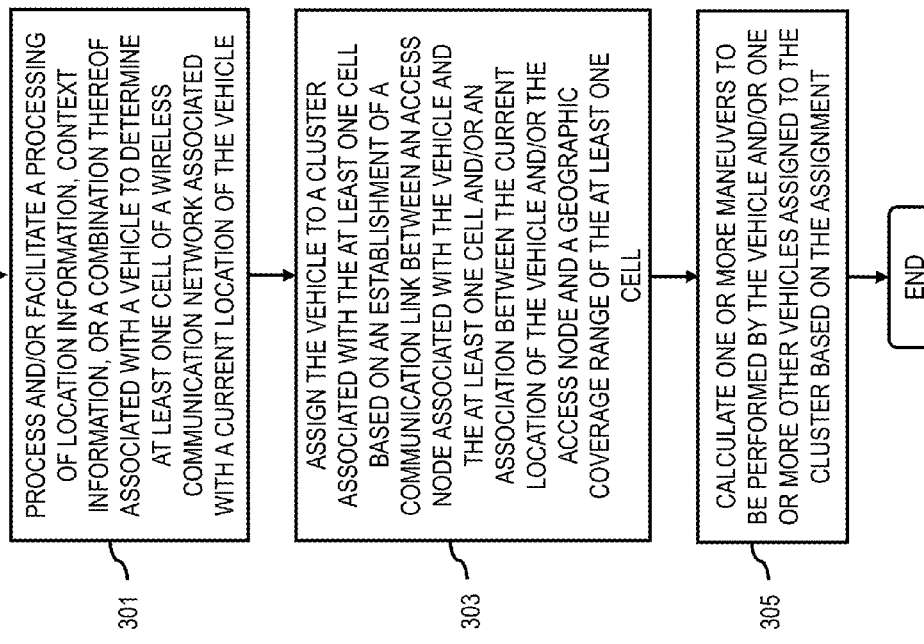

FIG. 3A
300

301 — PROCESS AND/OR FACILITATE A PROCESSING OF LOCATION INFORMATION, CONTEXT INFORMATION, OR A COMBINATION THEREOF ASSOCIATED WITH A VEHICLE TO DETERMINE AT LEAST ONE CELL OF A WIRELESS COMMUNICATION NETWORK ASSOCIATED WITH A CURRENT LOCATION OF THE VEHICLE

303 — ASSIGN THE VEHICLE TO A CLUSTER ASSOCIATED WITH THE AT LEAST ONE CELL BASED ON AN ESTABLISHMENT OF A COMMUNICATION LINK BETWEEN AN ACCESS NODE ASSOCIATED WITH THE VEHICLE AND THE AT LEAST ONE CELL AND/OR AN ASSOCIATION BETWEEN THE CURRENT LOCATION OF THE VEHICLE AND/OR THE ACCESS NODE AND A GEOGRAPHIC COVERAGE RANGE OF THE AT LEAST ONE CELL

305 — CALCULATE ONE OR MORE MANEUVERS TO BE PERFORMED BY THE VEHICLE AND/OR ONE OR MORE OTHER VEHICLES ASSIGNED TO THE CLUSTER BASED ON THE ASSIGNMENT

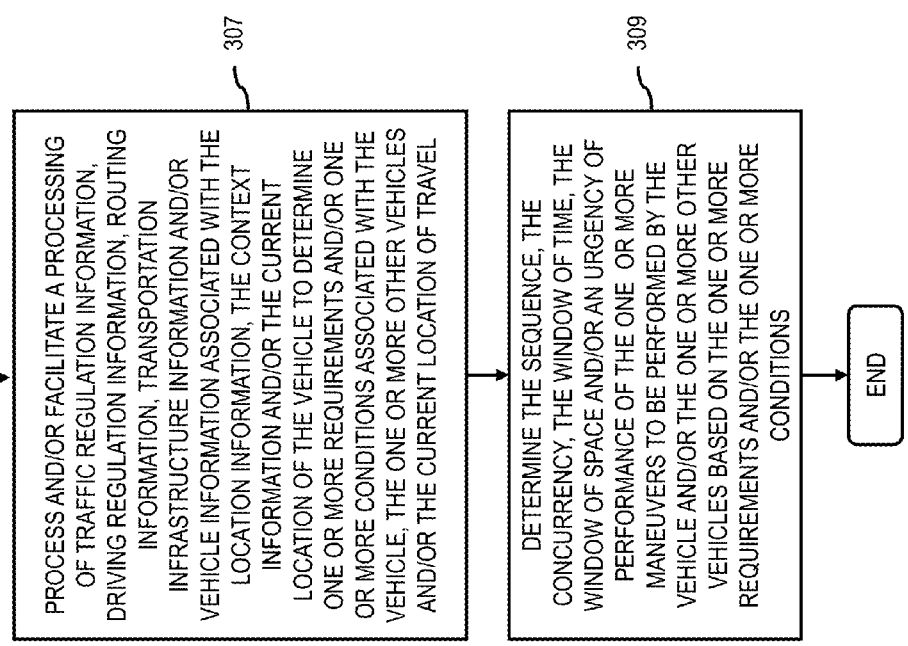

400

410

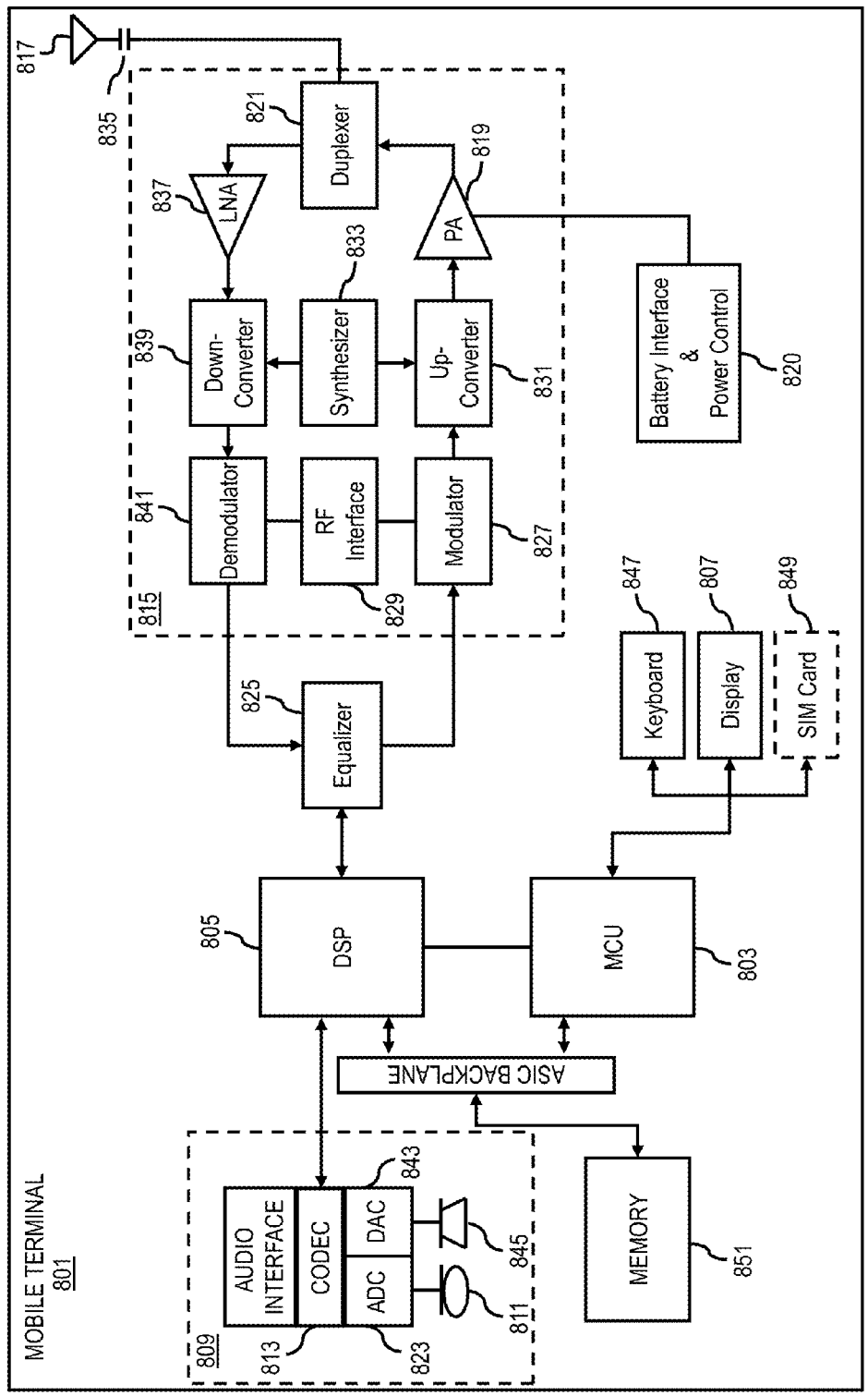

METHOD AND APPARATUS FOR GENERATING VEHICLE MANEUVER PLANS

BACKGROUND

Service providers and device manufacturers (e.g., wireless, cellular, etc.) are continually challenged to deliver value and convenience to consumers by, for example, providing compelling network services. One area of interest has been the development of services for enhancing the driving capabilities of vehicles.

SOME EXAMPLE EMBODIMENTS

Therefore, there is a need for an approach for generating maneuver plans for one or more vehicles.

According to one embodiment, processing and/or facilitating a processing of location information, context information, or a combination thereof associated with a vehicle to determine at least one cell of a wireless communication network associated with a current location of the vehicle. The method further comprises assigning the vehicle to a cluster associated with the at least one cell based on an establishment of a communication link between an access node associated with the vehicle and the at least one cell, an association between the current location of the vehicle, the access node associated with the vehicle, or a combination thereof and a geographic coverage range of the at least one cell or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of location information, context information, or a combination thereof associated with a vehicle to determine at least one cell of a wireless communication network associated with a current location of the vehicle. The apparatus is further caused to assign the vehicle to a cluster associated with the at least one cell based on an establishment of a communication link between an access node associated with the vehicle and the at least one cell, an association between the current location of the vehicle, the access node associated with the vehicle, or a combination thereof and a geographic coverage range of the at least one cell or a combination thereof.

According to another embodiment, a computer-readable storage medium carries one or more sequences of one or more instructions which, when executed by one or more processors, cause, at least in part, an apparatus to process and/or facilitate a processing of location information, context information, or a combination thereof associated with a vehicle to determine at least one cell of a wireless communication network associated with a current location of the vehicle. The apparatus is further caused to assign the vehicle to a cluster associated with the at least one cell based on an establishment of a communication link between an access node associated with the vehicle and the at least one cell, an association between the current location of the vehicle, the access node associated with the vehicle, or a combination thereof and a geographic coverage range of the at least one cell or a combination thereof.

According to another embodiment, an apparatus comprises means for processing and/or facilitating a processing of location information, context information, or a combination thereof associated with a vehicle to determine at least one cell of a wireless communication network associated with a current location of the vehicle. The apparatus further comprises means for assigning the vehicle to a cluster associated with the at least one cell based on the establishment of a communication link between an access node associated with the vehicle and the at least one cell, an association between the current location of the vehicle, the access node associated with the vehicle, or a combination thereof and a geographic coverage range of the at least one cell or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B, 4A and 4B are flowcharts of processes for generating maneuver plans for one or more vehicles, according to various example embodiments;

FIG. 8 is a diagram of a mobile terminal (e.g., handset) that can be used to example implement an embodiment of the invention.

DESCRIPTION OF SOME EMBODIMENTS

Examples of a method, apparatus, and computer program for generating maneuver plans for one or more vehicles are disclosed. In the following description, for the purposes of explanation, numerous specific details are set forth in order to provide a thorough understanding of the example embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. It is further apparent to one skilled in the art that the embodiments of the invention may be combined in any combination.

Although various embodiments are described with respect to vehicles, it is contemplated that the exemplary methods, apparatus and systems described herein may be used in connection with any other location based service or application that relies on such data. This may include, for example, beacon or tracking systems, navigation and mapping systems, pattern recognition systems and any other like systems. Consequently, the exemplary embodiments herein may apply to autonomous vehicles, manually driven vehicles, pedestrians travel, etc. In addition, the exemplary methods and systems herein may interact with various user equipment, including smart phones or personal navigation devices that are configured to provide various mapping or navigation services.

Figure 1:
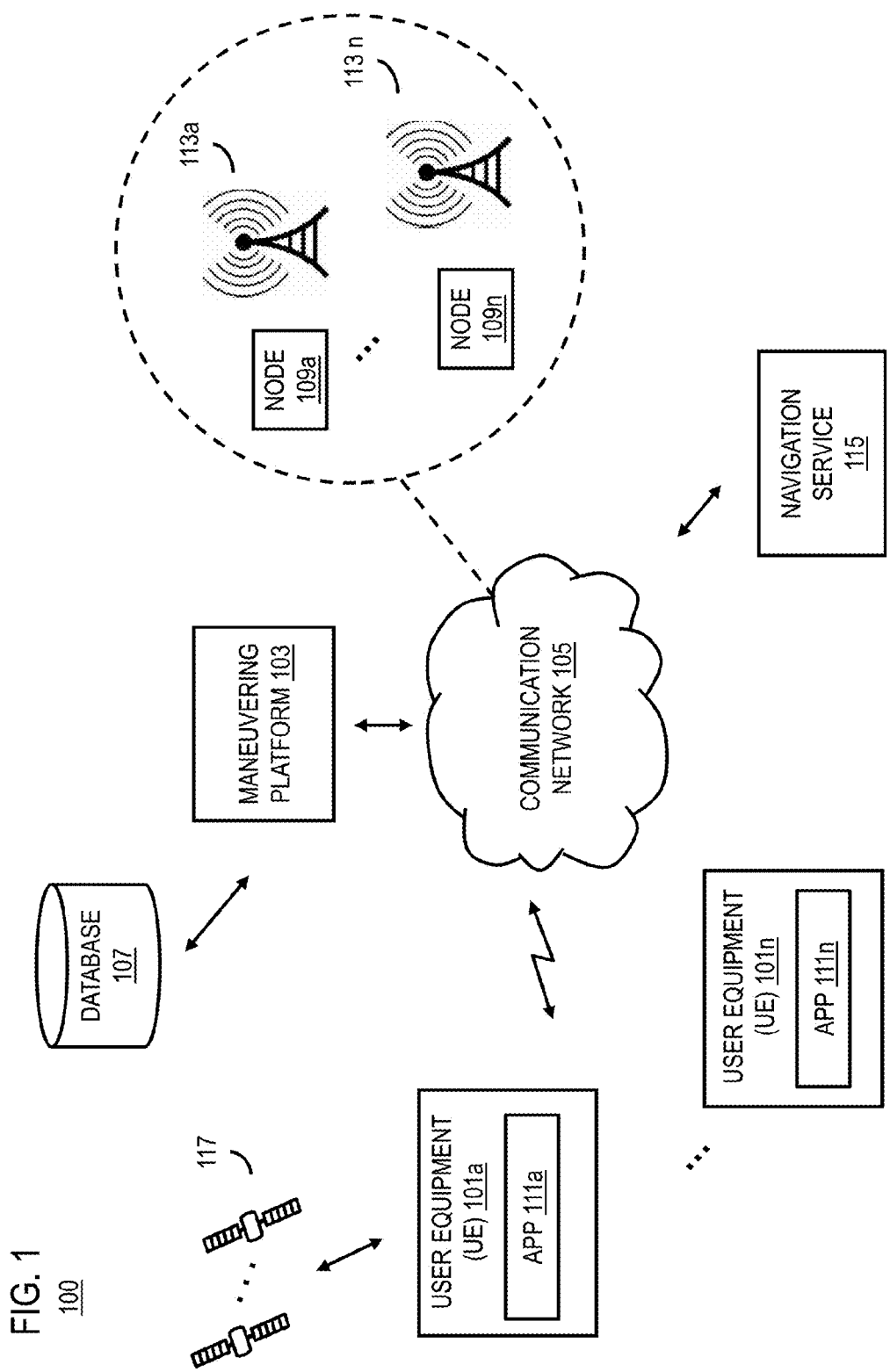
FIG. 1 is a diagram of a system for generating maneuver plans for one or more vehicles, according to one example embodiment.

FIG. 1 is a diagram of a system for clustering, i.e., grouping one or more vehicles during travel and/or generating maneuver plans for the one or more vehicles, according to one example embodiment. For the purpose of illustration herein, a maneuver plan may include one or more driving maneuvers to be performed by a vehicle or a group thereof based on the current location, the navigation environment, the status of the one or more vehicles or drivers, the context of the one or more vehicles or drivers or any combination thereof. As such, a maneuver plan may pertain to any series actions, messages, responses or behaviors exhibited (or to be exhibited) by an individual vehicle or a collective thereof. This may include, for example, a turning of a vehicle, a stoppage of a vehicle, a changing of acceleration of a vehicle, a changing of an operational mode of a vehicle (e.g., cruise control, manual drive mode, autonomous mode), an activation or deactivation of a function of a vehicle (e.g., high beam lights, windshield wipers), sending a message, etc. It is noted that the one or more maneuvers as planned may be intended to fulfill a safety or emergency objective, a destination/routing objective, an energy conservation objective (e.g., fuel savings, carbon footprint savings), a sightseeing objective, or a combination thereof. Vehicles in a group may receive the same maneuver plan or a maneuver plan that is customized for one or more individual vehicles associated with the cluster.

By way of example, system 100 of FIG. 1 enables navigation systems (e.g., as used by manually driven or autonomous vehicles) to calculate one or more maneuvers to be performed by a vehicle or a group thereof. In one embodiment, the maneuvers may be coordinated and thus planned, for performance concurrently and/or sequentially, to fulfill a specific driving or navigation objective relative to a current location, and/or a further location of the one or more vehicles. The maneuvers are performed by an individual vehicle or cluster (e.g., select group) of vehicles having the same location of travel (e.g., segment of roadway, highway, region, area, etc.), having similar driving and traffic conditions/context, having similar safety or precautionary needs, etc., or any combination thereof. In addition, the system 100 enables the maneuvers as calculated to be communicated with the vehicles for affecting individual or group driving behavior, to thus fulfill the driving or navigation objective.

In one embodiment, a maneuvering platform 103 interfaces with one or more user equipment (UE) 101a-101n (also collectively referred to as UE 101) associated with a vehicle. The maneuvering platform 103 is also configured to interact with one or more cellular towers or wireless network access points 113a-113n (referred to herein collectively as cells 113) for supporting the monitoring of UE 101 connected to the cells. In one embodiment, the cells 113 are Base Transceiver Stations (BTSs). In one embodiment, the maneuvering platform 103 can be connected, implemented, and/or embedded in the BTSs and/or any other implementation of the cells 113. In yet another embodiment, the functions of the maneuvering platform 103 can be connected, implemented, and/or embedded in a Base Station Controller (BSC) (e.g., one or more BSCs that control over cover the cells 113).

By way of example, mobile phones, wireless tablets, laptops, navigation systems, vehicular control systems and other UE 101 may establish a connection with the maneuvering platform 103 via the cells 113 as a vehicle travels within the cell's coverage area. Each cell may include an antennae, one or more sets of transmitter/receivers (e.g., transceivers), one or more central processing units (CPU), one or more digital signal processors, control electronics, one or more memory units, a GPS receiver for timing (e.g., for supporting CDMA2000/IS-95 or GSM systems), primary and backup electrical power sources, sheltering, etc.

In certain architectures, including those for supporting Long-Term Evolution (LTE) high speed communication, the cells 113 may also feature various radio/communication hardware nodes known as Evolved Network B (eNodeB) modules 109a-109n. Referred to herein as nodes 109 collectively, they are configured to communicate directly with UE 101 in a fashion similar to a base transceiver station (BTS) in a Global System for Mobile (GSM) communications cellular network. Under this scenario, the maneuvering platform 103 may connect to the node 109 or cellular infrastructure directly through a low-latency backbone channel. Per this scenario, the maneuvering platform 103 interfaces directly with the cell 113. It is noted that the maneuvering platform 103 may operate in connection with any form or configuration of base station, i.e., cells 113, for supporting wireless signal generation and exchange with respective UE 101. Furthermore, the cells 113 may be infrastructure elements/components of a communication network 105. The exemplary embodiments herein contemplate any known and still developing implementations of cells 113 and/or node 109 architectures for communicating with UE 101 that are subscribed to the communication network 105.

As noted above, the UE 101 may be any communication ready software application or apparatus, or a combination thereof, such as a network access node, for operating in connection with a vehicle during travel. In one embodiment, the UE 101 may correspond to an onboard navigation system for supporting vehicular navigation. Under this scenario, the UE 101 may be directly integrated within the dashboard of the vehicle and accessed by a driver via touch or voice based input. Alternatively, the UE 101 may correspond to a control system for directly guiding and regulating the actions or behaviors of the vehicle, i.e., an autonomous vehicle. Still further, the UE 101 may be a mobile device such as a smartphone, a tablet computer, a mobile communication device, a personal computer, a dashboard computer, an infotainment system, a music player, a video player, a television, a game device, a navigation device, a wearable device or a personal navigator associated with a driver or passenger. Per this scenario, the UE 101 may be physically integrated with a control system via a wired or wireless connection or operated within the vehicle as a standalone unit. It is also contemplated that the UE 101 can support any type of interface to the user (such as "wearable" circuitry, etc.).

Regardless of implementation, the UE 101 may be configured with one or more navigation applications 111a-111n (also collectively referred to as applications 111) for retrieving and/or generating navigation information. Moreover, in certain instances, the navigation applications 111 may access a navigation service (e.g. a routing engine) 115 via a communication network 105 to acquire navigation instructions, location information, mapping information, routing instructions or the like. The maneuvering platform 103 may interact with the navigation applications 111, the navigation service 115 or a combination thereof to facilitate the generation of one or more navigation instructions or maneuvers to be executed by the vehicle.

The UE 101 may also employ various sensors for receiving and analyzing location data and/or contextual data regarding the vehicle, the driver or passengers, other vehicles, conditions regarding the driving environment, the travel path, etc. By way of example, the sensors may be directly integrated within the UE 101 or selectively placed about the vehicle. The sensors may include global positioning system (GPS) receivers for interacting with one or more satellites 117 to determine speed, position, trajectory, orientation and location data associated with the vehicle, other vehicles or UE 101 within proximity of the vehicle, etc. In addition, the sensors may gather tilt data (e.g., a degree of incline or decline of the vehicle during navigation), motion data, light data, sound data, image data, weather data, temporal data and the like associated with the vehicles and/or UEs 101 thereof relative to the location of travel.

Also, information may be gathered by the UE 101 for determining or detecting a type, function, context or mode operation of the vehicle. Per this scenario, UE 101 may interface with a control or navigation system of the vehicle, an acoustic transmission unit (ATU) of the vehicle, an identification module of the vehicle, or the like for accessing relevant contextual data. This may include, for example, steering maneuver information, pedal usage information, gas usage information, wiper usage information, headlight usage information, stereo system usage information, driver identification information, destination/target location information, or the like for a given distance or time period. In addition, capability information regarding the sensors or the control/navigation system along with vehicle status information, the vehicle type/make/model information, vehicle dimension information, or a combination thereof may also be acquired. Still further, information regarding the UE 101 including identification information and status information, may be acquired from a subscriber identity module, the provider of the cell 113/network to which the UE 101 is subscribed, one or more third party data sources associated with the UE 101, or a combination thereof.

It is noted that the UE 101 may request the above described information directly by way of the one or more sensors. Alternatively, the UE 101 may detect this information as it is broadcast locally by the control or navigation system via a short range communication link or wired connection. In the case of the latter, the wired connection may be established by way of an on-board diagnostic (OBD) port.

The UE 101 may also detect transient network and/or wireless signals, such as those transmitted by nearby devices during navigation of the vehicle along the travel path. This may include, for example, network routers configured within a premise (e.g., home or business), another UE 101 or vehicle, a communicable traffic system (e.g., traffic lights, traffic cameras, traffic signals, digital signage), or the like. The sensors of the UE 101 may also include broadband antennas for detecting the presence of cellular towers as the UE 101/vehicle enters the coverage range of the cell 113 during the course of travel. Upon detection, the UE 101 may also formulate a connection with the cell 113 based on a subscriber agreement with the provider of the cell 113, any known network access protocols and standards, etc.

It is noted, therefore, that the UE 101 may serve as a device for detecting and acquiring relevant sensory data as well to facilitate the exchange of said data based on the formation of a communication link (connection). As the UE 101 travels in connection with the vehicle, it may persistently collect and/or share such information relative to its location of travel. For the purpose of illustration, that the UE 101 may be interpreted as synonymous with the vehicle within the context of vehicular travel. Furthermore, the location of travel may define various location points, points of interest, roadway segments, links, nodes (e.g., endpoints, termination points), lanes, intersections, objects, destination/target location, or other elements specific to a particular set or range of coordinates.

In one embodiment, the maneuvering platform 103 interacts with the UE 101 to gather and process the above described location information and contextual information, i.e., based on the connection between the UE 101 and corresponding cell 113. By way of example, this may correspond to an assignment or registration process, wherein the connected UE 101 automatically transmits current location and/or contextual information (e.g., its identification) over the connection in response to the vehicle/UE 101 entering a radio network coverage area or the geographical area of the cell 113. Under this scenario, the maneuvering platform 103 determines the connection and validates the assignment of the UE 101 to the specific cell 113 accordingly. The assignment or registration may also correspond to an identification of the UE 101 for enabling persistent monitoring of location and/or contextual information regarding the identified UE 101.

In one embodiment, the maneuvering platform 103 analyzes the location information and contextual information to determine the behavior, actions and/or requirements of a vehicle as it travels within range of the cell 113 alone or relative to other vehicles. Based on the analysis results, the maneuvering platform 103 then determines within range of the cell 113 a "cluster" or group of other vehicles (e.g., UE 101) corresponding to the same location of travel that exhibit similar behaviors, are executing similar actions, have the same context, have the same driving requirements, or any combination thereof. Vehicles may then be assigned to an existing cluster or a newly established cluster. Under this scenario, a cluster may include one or more vehicles requiring similar or related maneuvers to be performed individually or collectively in order to fulfill a driving requirement. Exemplary driving requirements may include, for example, the need to abide by local driving ordinances and traffic laws, the need to reach a particular destination or utilize the same travel paths (e.g., roadways, exits), the need to prevent an accident or respond to an emergency condition, etc. It is noted that the one or more vehicles of a cluster are interdependent, i.e., a maneuver to be executed by one vehicle is dependent upon the execution of another.

Per this approach, as different UE 101 enter within range of and connect with a cell 113 for a given region, they may be assigned to one or more different clusters accordingly. The size, area, number and scope of clusters may also be adapted as different vehicles enter or exit the coverage area of the assigned cell or as behaviors, actions and or needs of the group change. Still further, different clusters may be created or dissolved to accommodate different vehicles entering into an area relative to their changing needs or conditions during travel. It is noted that as two or more clusters may fully or partially cover the same geographical area within the radio network coverage of the cell 113, the clusters respectively relate (at least in part) to different behavior, actions, requirements, context, or any combination thereof. Also, a single cell 113 may be associated with multiple clusters having limited/changing lifespans. Still further, a single vehicle/UE 101 may be assigned to a single cluster, or multiple clusters at any one time during a cell 113 connection.

The maneuvering platform 103 therefore manages the assignment, geographical size, adjustment of the geographical size, creation and dissolution of clusters as vehicles travel about a geographic region corresponding to the cell 113. A main/center/general geographical location of the cluster may be substantially stationary, or the main/center/general geographical location may move according to the vehicles assigned to an assigned cluster. Hence, it is noted further that a cluster may be created for a specific area, i.e., a road intersection, a highway exit/entrance, a specific road section, a parking area, a traffic construction area, an area with specific weather conditions, etc., even before a vehicle enters said area. In addition, a UE 101 may also send a request for a maneuver help/plan/instructions and thus initiate creation of a specific cluster.

As an example, a first vehicle corresponding to a first set of location and contextual information (e.g., detected intention, current location, destination location, way point location, geospatial coordinates; current speed, bearing and trajectory; current and impending roadway segments and/or links; vehicle dimensions and spacing; road speed restrictions and stoppage requirements) may be analyzed against a second set of location and contextual information for a second vehicle. Each of the first and second vehicles are associated with UE 101 capable of interacting with the maneuvering platform 103 when connected with a cell 113. Resultantly, the first and second set of location and contextual information for the respective vehicles is transmitted via the connection—i.e., as real time information—and analyzed by the maneuvering platform 103. Based on the analysis, the maneuvering platform 103 may determine a commonality between the location of the first and second vehicles and the geographic coverage range of the cell 113. In addition, the analysis may reveal a level of match or overlapping of intentions/needs of the first and second vehicles, i.e., to within a predetermined threshold of similarity, relative to the current (or impending) location of travel.

Under this scenario, each of the vehicles may be assigned by the maneuvering platform 103 to an existing cluster that includes other vehicles with matching intentions/needs. Alternatively, when the level of match or overlapping of intentions/needs between the first and second vehicles meets the predetermined threshold of similarity with one another but not an existing group of vehicles, the maneuvering platform 103 may generate a new cluster and assigns the first and second vehicle to the new cluster. This may correspond to a scenario wherein the first and second vehicles are newly entered into the cell 113 range, but are not within proximity of an existing cluster of vehicles for the same location of travel. Still further, when there is no affinity between the first or second vehicle with one another or any other group of vehicles, the first and second vehicles are assigned to separate clusters. For the purpose of illustration, each of the clusters associated with a particular cell 113 may be recorded via a (static or temporary) database 107 for referencing the identification, location, trajectory, capabilities, requirements, behaviors, etc., of a respective vehicle or group thereof. It is contemplated, in future embodiments, that the clusters and associated behaviors/actions, may also be archived for future use.

In one embodiment, the maneuvering platform 103 calculates one or more maneuvers that are to be performed by the one or more vehicles assigned to a cluster. The one or more maneuvers may correspond to various actions or behaviors to be performed in a coordinated manner to fulfill a driving intention/need of the one or more vehicles. Under this scenario, the one or more maneuvers may be performed by the vehicles assigned to the cluster sequentially, concurrently, or a combination thereof (as a maneuver plan). Moreover, the one or more maneuvers are calculated to be performed within a limited time frame or work space based on the known location and/or contextual data regarding the vehicles. Still further, the calculation of the one or more maneuvers accounts for the specific role, function or status of each vehicle within the cluster for enabling the execution. It is noted, therefore, that the maneuvering platform 103 may interact with the UE 101 of respective vehicles as they are connected to the cells 113 to enable the fulfillment of the one or more maneuvers.

In one embodiment, the one or more maneuvers are calculated based on various factors, including the current location of travel of the vehicles and the determined intentions, needs or requirements of the vehicles assigned to the cluster. The requirements may be identified based on a predetermined routing or destination objective of one or more of the vehicles. For example, the cluster may include vehicles that are already interacting with a navigation service 115 for driving to a specific destination or in the direction thereof. Under this scenario, the maneuvering platform 103 may retrieve the routing instructions from the UE 101 or the navigation service 115; thus assigning these vehicles to a matching cluster and developing maneuvers intended to fulfill the routing objective per the cluster.

The one or more maneuvers may also be calculated on the basis of various safety or traffic condition requirements. For example, the maneuvering platform 103 may utilize current location and/or contextual information for the vehicles of the cluster to acquire relevant traffic condition information, weather condition information, or the like from the navigation service 115 or other provider. This information may specify current travel times, roadway obstructions and accidents along a path of travel, congestion periods, etc. As another example, the maneuvering platform 103 may retrieving driving ordinance information from a city or municipal database corresponding to the location of travel of the cluster in order to determine relevant rules and regulations. Per this example, the rules and regulations may specify speed limits (minimum and maximums) for a given segment of roadway, stoppage requirements, lane numbers and directions, lane merges, parking zones, bike lane requirements, etc. The maneuvering platform 103 may calculate one or more maneuvers to be performed by each vehicle of the cluster to ensure the vehicles account for traffic and/or abide by location specific ordinances.

Still further, the maneuvers may be calculated based on the contextual information gathered by the various sensors of UE 101 for respective vehicles. For example, a maneuver for directing a vehicle from a leftmost lane of a highway to the rightmost lane may be specified based on a low fuel level or poor driving performance of the vehicle. Under this scenario, the vehicle can more readily exit the highway at an upcoming exit corresponding to the direction of a gas station or repair shop, while the other vehicles continue in the same direction along the highway. Also, transportation infrastructure data conveyed to a UE 101 during travel of a vehicle may be analyzed. Under this scenario, status information conveyed by a communicable stop signal for indicating an impending red light, an error message transmitted regarding a mechanical bridge control, alert information as broadcast by digital construction road cones, etc., may be used to calculate a responsive maneuver.

Still further, the maneuvering platform 103 may access reference data, mapping data and the like for determining the characteristics of the transportation infrastructure. For example, in the case of communicable traffic devices, reference code information for interpreting any transmitted signals may be acquired by the maneuvering platform 103 for enabling data interpretation. Also, the maneuvering platform 103 may access various resources for indicating road quality information (e.g., paved or unpaved; dry or wet; lane markings, etc.), road boundary information (e.g., delineators, guardrails, shoulders, curbs), traffic light and sign locations, temporary obstructions (e.g., traffic barricades). Under this scenario, for example, a maneuver may be calculated to reduce a speed of a vehicle within the cluster based on an impending construction zone or due to the curvature/geometry of a roadway. As noted, this data may be retrieved from one or more third party resources, the navigation service 115, crowd sourced data, etc.

It is noted that the maneuvering platform 103 may process data from various sources in connection with different scenarios for calculating one or more maneuvers. In one embodiment, the maneuvering platform 103 also determines the roles to be executed by respective vehicles assigned to a cluster for enabling coordinated performance of the maneuvers. The roles define the particular status, function or action to be executed or taken by each vehicle relative to the determined intentions/needs of the cluster and the location of travel. By way of example, the roles may include an active maneuver plan participant, a passive maneuver plan participant or an offline participant. Table 1 below defines the various roles:

TABLE 1

| | |
|---|---|
| Active Maneuver Plan Participant | Active participants correspond to UE 101/vehicles that are necessary/required to perform one or more coordinated maneuvers in association with the cluster to support execution of the maneuver plan. Active UE 101 receive a maneuver plan proposal as part of the overall execution. If the UE 101 agrees to execute the plan, they must carry it out. Only UE 101 that formulate a connection with the cell 113, per the maneuvering platform 103, may become active. The UE 101 may also request for a maneuver help/plan/instructions. |
| Passive Maneuver Plan Participant | Passive participants correspond to UE 101/vehicles that do not have to adjust their status for successful execution of a maneuver plan, but could interfere with the maneuver plan if the behavior of the vehicle changes. Furthermore, UE 101 become passive maneuver plan participants if they can provide additional (sensor) data to support the maneuver plan execution. Only UE 101 that formulate a connection with the cell 113, per the maneuvering platform 103, may become active. |
| Offline | An offline UE 101/vehicle is a traffic participant that is not connected to a cell 113 via the maneuvering platform 103. Offline UE 101 can be observed through available sensors, but are not subject to a maneuver plan. |

It is noted that the assigned role determines the level of involvement of a vehicle assigned to a cluster in performing one or more maneuvers required to be performed for fulfilling the intentions/needs of each vehicle and/or the cluster.

As will be discussed further later herein, execution of the one or more maneuvers may also be based upon or may account for different maneuver plan classes or states of execution.

In addition to defining one or more roles, the one or more maneuvers to be performed may be categorized by the maneuvering platform 103 into classes, according to one embodiment. An urgent classification may correspond to a maneuver that is to be performed relative to an emergency need. By way of example, maneuvers classified as urgent result in the full utilization of the maneuvering capabilities of the vehicle, i.e., taking sharp turns, full braking, increased velocity. Under this scenario, a vehicle executing an urgent maneuver may exit a road to enter onto the emergency shoulder, make way for incoming emergency vehicles, suddenly veer in a given direction to avoid a collision with another vehicle participant, etc.

In the case of a forced classification, this corresponds to the performance of maneuvers that differ from the preferences of the driver or that may be deemed inconvenient. For example, forced maneuvers may include applying the brakes to line a vehicle up with vehicles in neighboring lanes or to maintain a recommended distance between respective vehicles. Another forced execution may include gracefully stopping the vehicle at a recommended stop line or in response to a stop sign. It is noted that forced maneuvers are triggered by the transportation infrastructure, such as a lane merging, flashing red lights or zebra line crossing.

A default classification corresponds to all other maneuvers. Maneuvers classified as default can restrict the inconvenience they are willing to take in order to enable other vehicles' maneuvers. For example, a car wishing to switch lanes immediately may have the request denied because it requires too sudden braking from cars in the destination lane.

In one embodiment, the maneuver plans may be performed according to various states, including an unmanaged state, an initiation state or an execution state. The unmanaged state corresponds to a state where UE 101/vehicle are in line with safety regulations (e.g., has a feasible position and path of travel), traffic requirements, and other requirements and are furthermore is in full control of their movement. Typically, all UE 101 are mostly in this state for a given location of travel. Thus, most maneuver plans as recommended via the maneuvering platform 103 directly start and end in this state.

In the initiation state, the maneuvering platform 103 operates in connection with the cells 113 to initiate the interaction with the different UE 101 that are connected to the cell. By way of example, the nodes 109 are in a state of monitoring of location and/or context information associated with UE 101, calculating/recommending one or more maneuvers to be performed, their relative urgency and the roles of the vehicles involved, collecting acknowledgements from all involved vehicles assigned to a cluster, etc. In certain embodiments, the maneuvering platform 103 may also initiate the transmission of routing instructions, location information, contextual information and other relevant information regarding a vehicle to a different cell, such as via a soft handover procedure. By way of this approach, the continuity of the connection established with the cell 113 is maintained until a stable connection is established between the UE 101 and the different cell.

It is noted, in certain embodiments, that the maneuvering platform 103 may recommend or initiate the switching of connections during maneuver calculation in order to account for changes in location and spatial position. Under this scenario, for example, the window of execution or space of execution of a recommended maneuver may be calculated during connection of the UE 101 to a first cell to correspond to the location/range of a second cell. As another scenario, the switching may be initiated via the handover procedure in the case where the UE 101/vehicle was unable to follow the recommendation due to the dropping of the wireless signal connection or elapsing of the window of opportunity. In the case of the former, a virtual connection may be established via a wired low-latency cell-to-cell network being managed per the maneuvering platform 103.

The execution state follows the initiation state, i.e., when the vehicles of a cluster acknowledge and accept a recommended maneuver plan. During execution, the one or more calculated maneuvers are performed and the initiating and active vehicles/UE 101 stay within their assigned configuration window space. Passive vehicles, however, continue their planned path. It is noted that all connected UE 101 still continue to gather location and/or contextual information regarding the passive vehicles regardless so that they may to be prepared for possible interference, status changes of the passive vehicles, etc.

In one embodiment, once the maneuvers are performed, the maneuvering platform 103 notifies all of the vehicles of the cluster of the performance status of the maneuvers. This may correspond to a returning of the respective vehicles to an unmanaged (nature/primary) state, thus reflecting a period of travel when no particular impending requirements, needs, or managed execution by the maneuvering platform 103 need per executed. During this time however, the maneuvering platform still continues to acquire location and/or contextual information regarding the vehicles of the cluster. Thus, monitored behavior of the cluster or individual vehicles thereof is maintained persistently as long as the connection between respective UE 101 of the vehicles and the cells 113 corresponding to the location of travel is maintained.

In one embodiment, the maneuvering platform 103 initiates an updating of the cluster or recommends one or more additional maneuvers to be performed pursuant to the performance of one or more maneuvers; based on the acquiring of updated location and/or contextual information. In the case of the updating of the cluster, the cluster may be increased in size to reflect an increased number of vehicles that entered cellular region or to accommodate the entry of another vehicle that entered upon the roadway that is within proximity of the cluster. Alternatively, the cluster size may be reduced to reflect the exit of one or more vehicles pursuant to the maneuver plan or to account for a change in intent of one or more vehicles. For example, upon detecting a change in route of a vehicle that is assigned to a first cluster, a maneuver for reducing the speed of the vehicle so it is within proximity of a second cluster having the same or similar intent may be recommended. Resultantly, the maneuvering platform 103 assigns the vehicle to the second cluster and unassigns the vehicle from the first cluster. It is noted that this update may be maintained within the database 107 accordingly for actively recording all current (or historical) connections and cluster assignments.

Still further, the cluster may be aborted in its entirety upon successful completion or failure of the one or more maneuvers. Under this scenario, upon successful completion of the maneuver plan, each UE 101 signals successful termination to the maneuvering platform 103 and exits the cluster. Alternatively, in the case of abortion or failure of the one or more maneuvers, each UE 101 signals failed termination to the maneuvering platform 103 and exits the cluster. Hence, the adjusting of the intent/needs and scope of the cluster and/or the status of fulfillment of a driving objective/intent/requirement, dictates whether or not a cluster is to be sustained, whether or not additional maneuvers to be performed, etc.

It is noted that the above described execution of the system 100 offers several advantages. In one advantage, the maneuvering platform 103 operates in connection with the cells 113 as a "watchtower" or "detector." As such, is serves as a mechanism for actively and persistently monitoring the formation of connections between UE 101 and a cell 113 as vehicles travel to within the coverage area. As another advantage, this "watchtower" execution is achieved with little to no additional reconfiguring of an existing cell infrastructure.

As another advantage, the maneuvering platform 103 of system 100 interacts with the UE 101 of respective vehicles to gather information and groups said vehicles according to their perceived requirements, needs or intentions. By way of this approach, maneuvers for vehicles exhibiting a particular intent or behavior or having similar requirements may effectively be developed and coordinated for execution as opposed to performed individually. In the case of autonomous driving, this is a preferred means of managing vehicles relative to their environment, limited workspace and/or timing needs, etc., while maintaining adherence to necessary driving conventions and regulations.

Still further, as yet another advantage, by monitoring location and/or contextual information during active connectivity between the UE 101 of a vehicle and a cell 113, the range or scope of detection of UE 101 is extended beyond the immediate range of its own sensors. Rather, an individual UE 101 with limited sensing capacity is instead inducted into a mesh/umbrella network of other UE 101 corresponding to the same region of travel. The maneuvering platform 103 therefore augments the limited sensing capabilities of UE 101 with additional knowledge/data regarding other vehicles, events and conditions in common with the same region of travel. Per this approach, maneuvers may be calculated and recommended for execution in real-time based on the foreknowledge of events, requirements, characteristics, etc., of other vehicles located anywhere within a cellular coverage area.

For the purpose of illustration, the communication network 105 of system 100 may include one or more networks such as a data network, a wireless network, a telephony network, or any combination thereof. Hence, the cells 113 and/or corresponding nodes 109 may be contained within or associated with the communication network 105. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, maneuvering platform 103, nodes 109 and cells 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
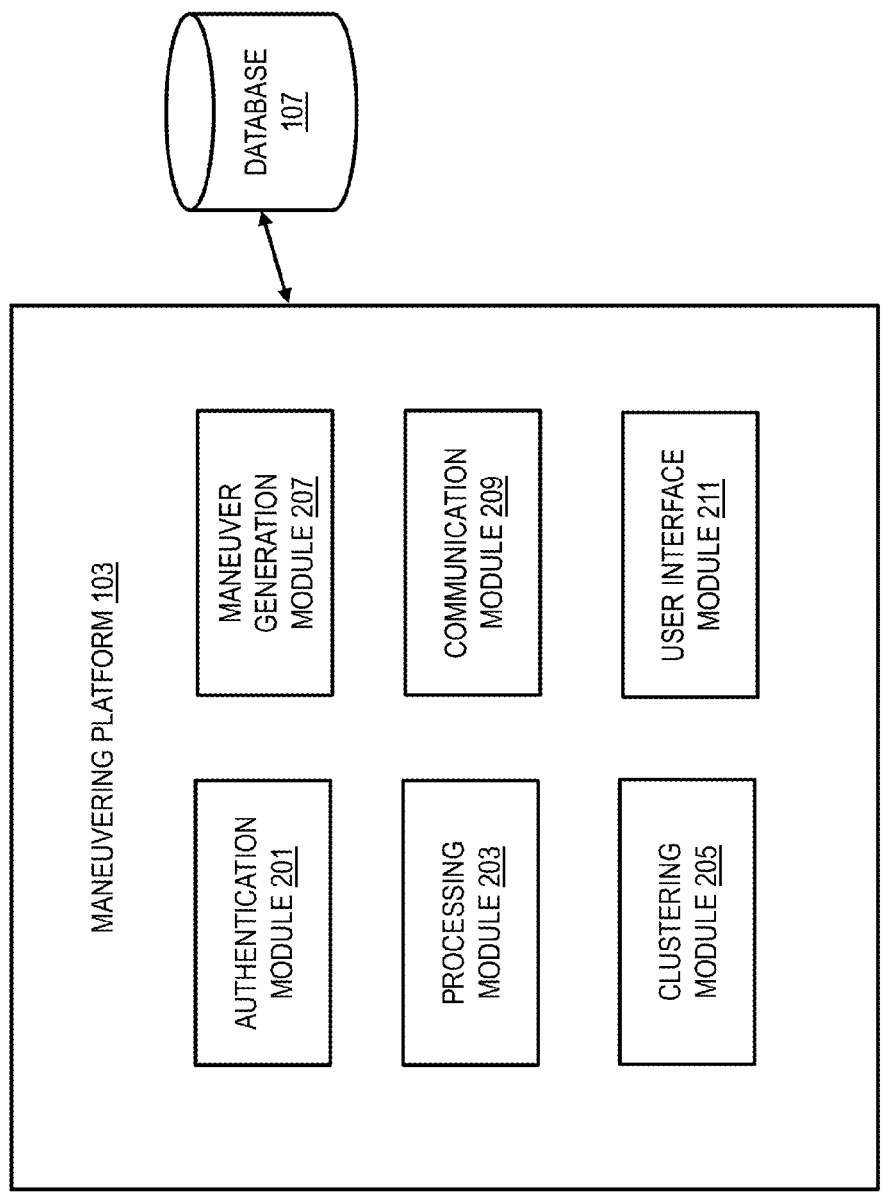
FIG. 2 is a diagram of a maneuvering platform, according to one example embodiment.
Figure 4A:
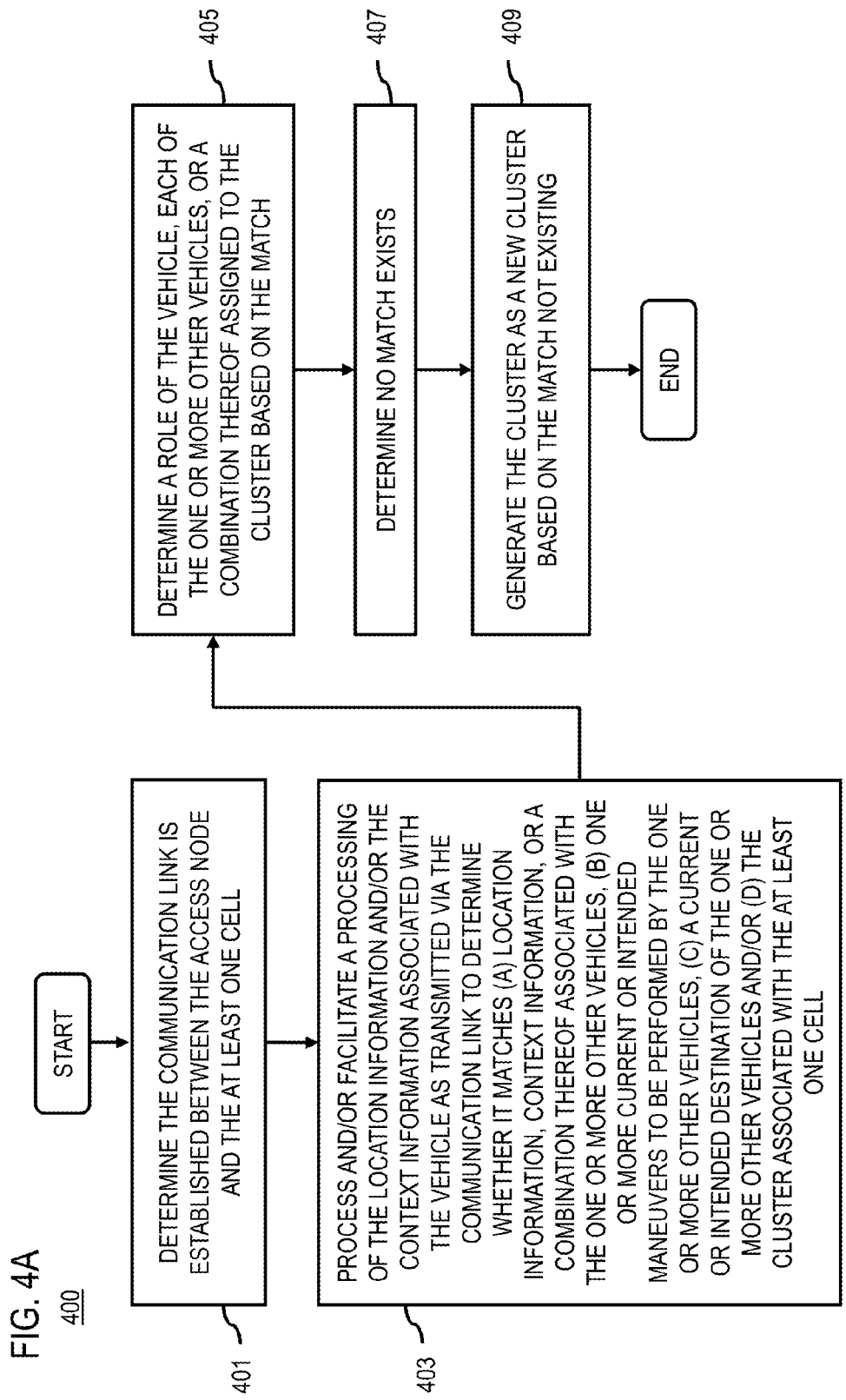
Figure 4B:
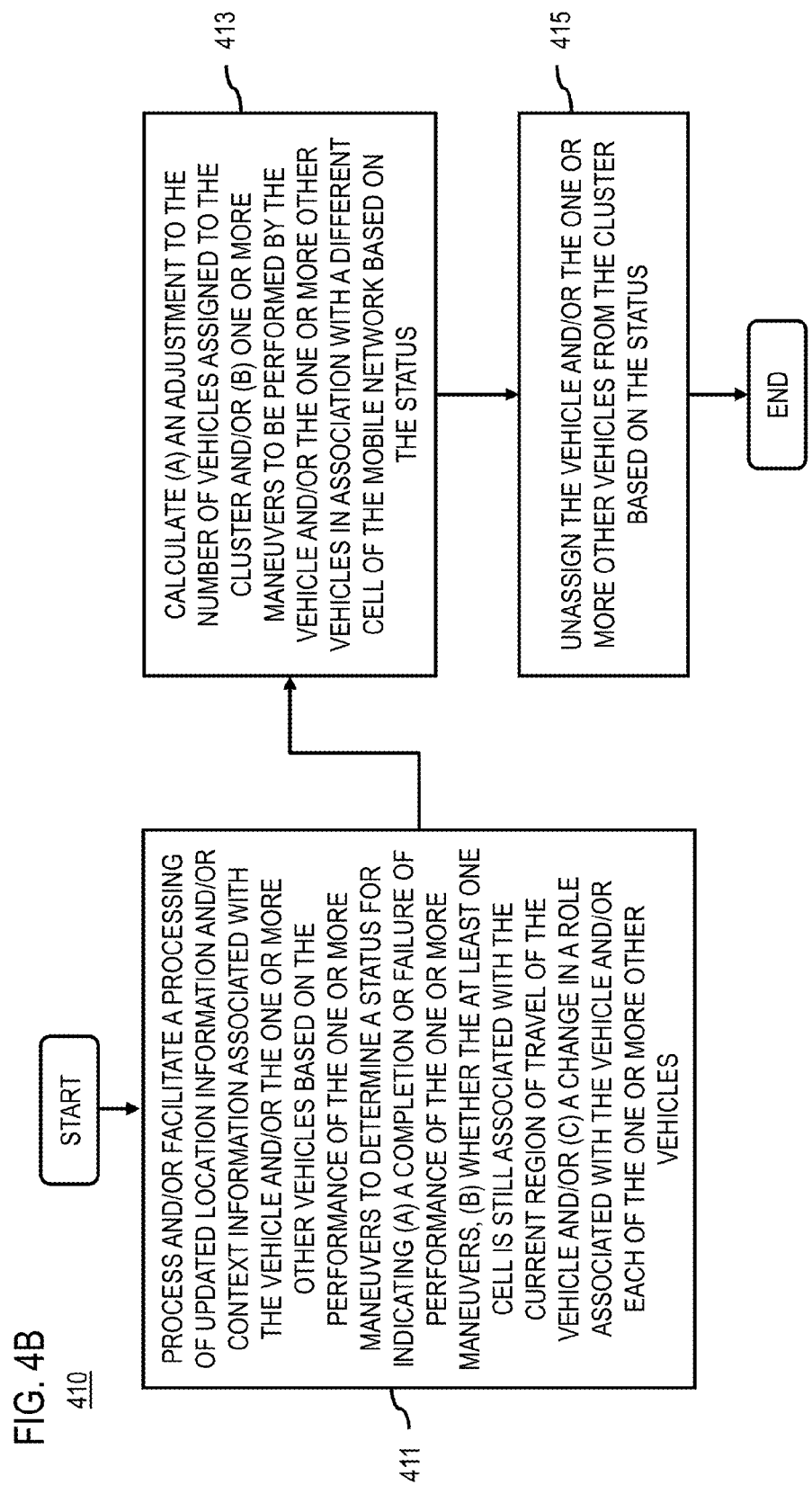

FIG. 2 is a diagram of the components of a maneuvering platform, according to one example embodiment. By way of example, the maneuvering platform 103 includes one or more components for generating maneuver plans for one or more vehicles. It is contemplated that the functions of these components may be combined in one or more components or performed by other components of equivalent functionality. In this embodiment, the maneuvering platform 103 includes an authentication module 201, a processing module 203, a clustering module 205, a maneuver generation module 207, a communication module 209 and a user interface module 211.

The authentication module 201 authenticates users and UE 101 for interaction with the maneuvering platform 103. By way of example, the authentication module 201 receives a request to access the maneuvering platform 103 via an application 111 of UE 101a-101n. The request may be submitted to the authentication module 201 via the communication module 209, which enables an interface between the UE 101a-101, i.e., via the navigation application 111 and the platform 103. In addition, the authentication module 201 determines the formation of a connection between a UE 101 and a cell 113 that services the location of travel of the UE 101, i.e., validates a connection with a cell 113. By way of example, the authentication module 201 may facilitate validation of subscriber/registration credentials of the UE 101 for enabling the connection in conjunction with the communication module 209 or detect an open communication between the UE 101 and the cell 113.

Still further, the authentication module 201 may facilitate access of the UE 101 to various resources for supporting the processing and analysis of location and/or contextual data by the processing module 203. This may include, for example, the accessing of a navigation service, a mapping service, a geographic database, a transportation infrastructure database, a local or municipal database, a crowdsourcing service, etc. It is noted that the information acquired from these sources may be processed by the processing module 203 as contextual data.

The processing module 203 operates in connection with the clustering module 205 to process location information related to the UE 101/vehicle. In addition, the processing module 203 processes context information acquired from UE 101 or the aforementioned data sources. Under this scenario, the processing module 203 analyzes the location information and contextual information to determine the behavior, actions and/or requirements of a vehicle as it travels within range of the cell 113 relative to other vehicles. Based on the analysis results, the clustering module 205 determines a "cluster" or group of other vehicles (e.g., UE 101) corresponding to the same location of travel that exhibit similar behaviors, are executing similar actions or have the same driving requirements. Vehicles may then be assigned by the clustering module 205 to one or more existing clusters, newly established clusters, or any combination thereof.

The maneuver generation module 207 calculates one or more maneuvers that are to be performed by the one or more vehicles assigned to the one or more clusters. The one or more maneuvers may correspond to various actions or behaviors to be performed in a coordinated manner to fulfill the determined driving intention/need of the vehicles. By way of example, the maneuver generation module 207 determines the appropriate sequence of execution of maneuvers as well as the limited time frame and/or work space of performance of the maneuvers relative to the current location and/or contextual data regarding the vehicles. Still further, the maneuver generation module 207 determines the one or more specific roles, functions or statuses of each vehicle within the one or more clusters for enabling the execution.

The maneuver generation module 207 also assigns classes to the one or more calculated maneuvers for specifying the priority of execution of a maneuver of a vehicle within the cluster. This may correspond to an urgent, forced or default class, wherein each class corresponds to a different situational occurrence or context (e.g., emergency action versus transactional/inconvenient action). In addition, the module 207 specifies an operating state to be associated with a calculated maneuver for affecting the execution. This may correspond to an unmanaged state, an initiation state or an execution state—each state representing a different stage in the lifecycle of operation of a vehicle during travel within the cluster as it interacts with the cell 113. The maneuver generation module 207 manages interaction between the UE 101 during this connection according to these different states.

Exemplary functions performed by the module 207 corresponding to each state or according to a given role include initiating a registration procedure for enabling UE 101 identity. In addition, the module 207 may determine the execution or acceptance of a recommended maneuver. Still further, the maneuver generation module 207 may operate in connection with the clustering module 205 to manage the updating of or elimination of clusters.

The maneuver generation module 207 may also operate in connection with the communication module 209 and user interface module 211 to cause the transmission or rendering of an instruction respectively. By way of example, the execution module 207 may trigger the user interface module 211, which executes one or more application programming interface (API) executions of the platform 103 for presenting the segments of the travel path, the associated behavior and/or response types, etc. As another example, the execution module may trigger the communication module 209 to transmit an instruction for initiating a behavior and/or response of the vehicle, per the vehicles navigation system (e.g., UE 101), in response to the approaching of the vehicle to the corresponding segment of the travel path.

The communication module 209 interacts with the UE 101 as it is connected with a cell 113 to facilitate the receipt of location and/or contextual information regarding the vehicle. In addition, the communication module 209 may receive a request directly from the UE 101 for generation of maneuver help/plan/instructions. Once received, the communication module 209 further directs this information to the authentication module 201, processing module 203 or other modules accordingly. It is contemplated, in certain embodiments, that the communication module 209 may further support formation of a session over a network 105 with the node 109 of a cell 113 per known network protocols as opposed to typical formation of the connection via normal cellular communication procedures/means. Also, the user interface module 211 enables presentment of a graphical user interface for presenting the one or more recommended maneuvers. By way of example, the user interface module 215 generates the interface in response to application programming interfaces (APIs) or other function calls corresponding to the display of a navigation system, control system, mobile device, or the like associated with a vehicle.

The above presented modules and components of the maneuvering platform 103 can be implemented in hardware, firmware, software, or a combination thereof. Though depicted as a separate entity in FIG. 1, it is contemplated that the platform 103 may be implemented for direct operation by respective UE 101 or by the node 109 of a cellular tower 113. As such, the maneuvering platform 103 may generate direct signal inputs by way of the operating system of the UE 101 or the node 109 for interacting with the application 111. In another embodiment, one or more of the modules 201-211 may be implemented for operation by respective UE 101 as a platform 103, a cloud based service, or combination thereof.

Figure 7:
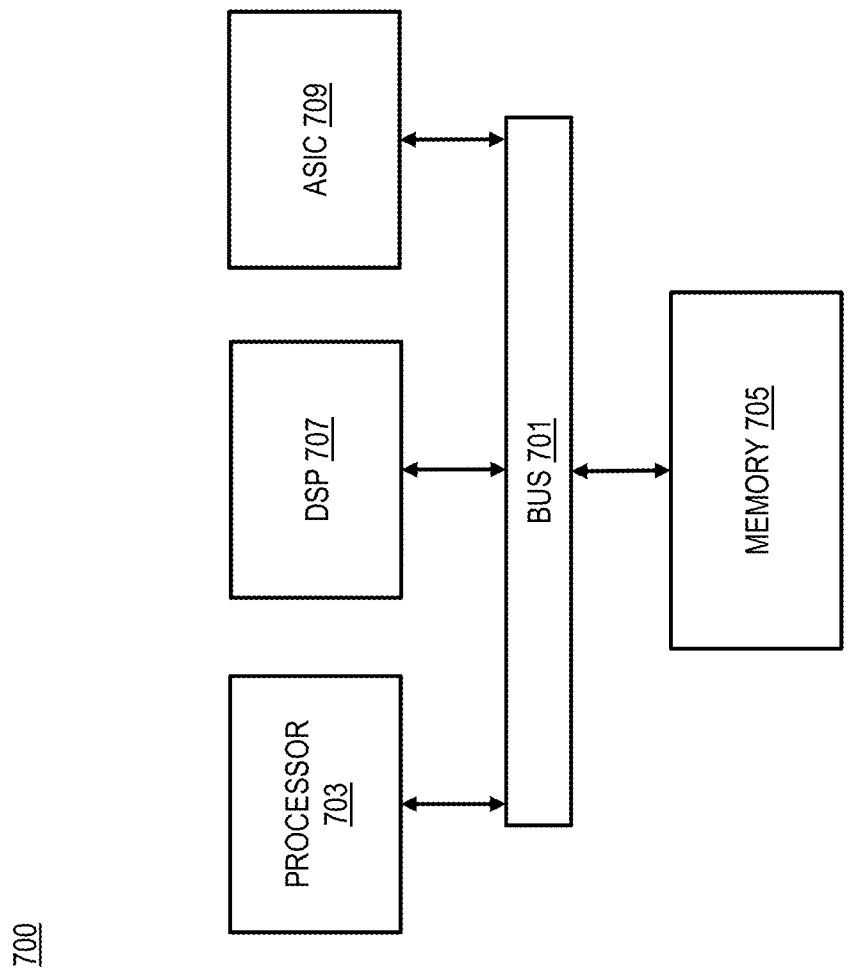
FIG. 7 is a diagram of a chip set that can be used to implement an example embodiment of the invention.

FIGS. 3A and 3B, 4A and 4B are flowcharts of processes for generating maneuver plans for one or more vehicles, according to various example embodiments. In one embodiment, the maneuvering platform 103 performs processes 300, 306, 400 and 410 and is implemented in, for instance, a chip set including a processor and a memory as shown in FIG. 7.

In step 301 of process 300, the maneuvering platform 103 processes and/or facilitates a processing of location information, context information, or a combination thereof associated with a vehicle to determine at least one cell of a wireless communication network associated with a current location of the vehicle. In another step 303, the platform 103 assigns the vehicle to one or more clusters associated with the at least one cell based on an establishment of a communication link between an access node 101 associated with the vehicle and the at least one cell, an association between the current location of the vehicle, the access node associated with the vehicle, or a combination thereof, and a geographic coverage range of the at least one cell or a combination thereof. As noted previously, the communication link may be established between the access node (e.g., a navigation application/apparatus, control system/apparatus, wireless network communication application/apparatus, or a combination thereof) and the cell 113 or a node 109 thereof based on known wireless and network communication protocols.

In step 305, the maneuvering platform 103 calculates one or more maneuvers to be performed by the vehicle, one or more other vehicles assigned to the cluster, or a combination thereof based on the assignment. As noted, the calculation may be performed based on the analysis of the contextual and/or location information acquired regarding the vehicle, one or more additional data sources (e.g., local traffic ordinance database), or the like.

The recommended maneuvers may include various turns, stops, messages, warnings, movements or other driving or behavioral actions that influence the operation and/or status of the vehicles, the execution of the collective of vehicles of the cluster, or a combination thereof. Also, the one or more maneuvers may be performed sequentially, concurrently, or a combination thereof within a window of time, a window of space, a window of area, or a combination thereof for controlling the behavior of the vehicle, the one or more other vehicles, or a combination thereof. Hence, the one or more maneuvers are finite as they are valid for and/or must be executed within a limited window of opportunity.

In step 307 of process 306 (FIG. 3B), the maneuvering platform 103 processes and/or facilitates a processing of traffic regulation information, driving regulation information, routing information, transportation infrastructure information, vehicle information, or a combination thereof associated with the location information, the context information, the current location of the vehicle, or a combination thereof to determine one or more requirements, one or more conditions, or a combination thereof associated with the vehicle, the one or more other vehicles, the current location of travel, or a combination thereof. Per step 309, the platform 103 determines the sequence, the concurrency, the window of time, the window of space, the window of area, an urgency of performance, or a combination thereof of the one or more maneuvers to be performed by the vehicle, the one or more other vehicles, or a combination thereof based on the one or more requirements, the one or more conditions, or a combination thereof.

It is noted that the calculation is based on the determined sequence, concurrency, window of time, window of space, urgency of performance, or a combination thereof and the current location of travel is associated with one or more location points, one or more points of interest, one or more roadway segments, one or more predefined navigation routes, one or more lanes, one or more intersections, or a combination thereof. Also, the window of time or space may correspond to a limited moment of opportunity for execution of a maneuver arising as a result of current conditions, obstacles associated with the path of travel, vehicle and/or traffic requirements, destination requirement, etc.

In step 401 of process 400 (FIG. 4A), the maneuvering platform 103 determines the communication link is established between the access node 101 and the at least one cell 113. Of note, the assignment is based on the match and the communication link is established based on the current location of travel of the vehicle being within range of the at least one cell, the access node being subscribed to a provider of the at least one cell, or a combination thereof.

In another step 403, the maneuvering platform 103 processes and/or facilitates a processing of the location information, the context information, or a combination thereof associated with the vehicle as transmitted via the communication link to determine whether it matches (a) location information, context information, or a combination thereof associated with the one or more other vehicles, (b) one or more current or intended maneuvers to be performed by the one or more other vehicles, (c) a current or intended destination of the one or more other vehicles, (d) the one or more cluster associated with the at least one cell, or (e) a combination thereof. As noted, the matching analysis corresponds to a determination of a level of affinity between the vehicles connected to the cell or affiliated with a given cluster.

In step 405, the maneuvering platform 103 determines one or more roles of the vehicle, each of the one or more other vehicles, or a combination thereof assigned to the one or more clusters based on the match. As noted previously, the role indicates a participation level, a priority, a status, or a combination thereof of the vehicle, the one or more other vehicles, or a combination thereof for performing the one or more maneuvers. Also, the access node 101 may be a mobile device associated with the vehicle, a navigation system of the vehicle, a control system of the vehicle, or a combination thereof.

In steps 407 and 409, the maneuvering platform 103 determines no match exists and generates the cluster as a new cluster based on the match not existing. As noted, the assignment is based on generation of the new cluster and the lack of match corresponds to a scenario wherein the intentions, requirements, behaviors, etc., of the vehicle do not align with an existing cluster.

In step 411 of process 410 (FIG. 4B), the maneuvering platform processes and/or facilitates a processing of updated location information, context information, or a combination thereof associated with the vehicle, the one or more other vehicles, or a combination thereof based on the performance of the one or more maneuvers to determine a status for indicating (a) a completion or failure of performance of the one or more maneuvers, (b) whether the at least one cell is still associated with the current region of travel of the vehicle, (c) a change in a role associated with the vehicle, each of the one or more other vehicles, or a combination thereof, or (d) a combination thereof. Per step 413, the maneuvering platform 103 calculates (a) one or more adjustments to the number of vehicles assigned to the cluster, (b) one or more maneuvers to be performed by the vehicle, the one or more other vehicles, or a combination thereof in association with a different cell of the wireless communication network, or (c) a combination thereof based on the status. It is noted that the one or more maneuvers to be performed by the vehicle, the one or more other vehicles, or a combination thereof in association with the different cell are indicated to the different cell by the at least one cell based on a handover procedure, the communication link between the access node and the at least one cell, or a combination thereof.

It is noted, in the case of a handover procedure, that the maneuvering platform 103 relating to a current cell 133*a* determines one or more new cells 113*n* onto which area the vehicle is likely moving based on its moving trajectory calculated by the current cell 113*a*. The maneuvering platform 103 sends at least part or all of the vehicle's cluster and maneuvering information to the one or more new cells 113*n* before the vehicle has moved to the area of and/or connected to any of the new cells 113n. The new cell 113n may then consider this predetermined vehicle cluster and maneuvering information from the previous cell 113a as an additional element/information for determining and assigning one or more clusters and maneuvers for the specific vehicle on its cell area.

In step 415, the maneuvering platform 103 unassigns the vehicle, the one or more other vehicles, or a combination thereof from the cluster based on the status. As mentioned previously, this may correspond to an adjusting of the characteristics and/or assignment of vehicles to the cluster.

Figure 5A:
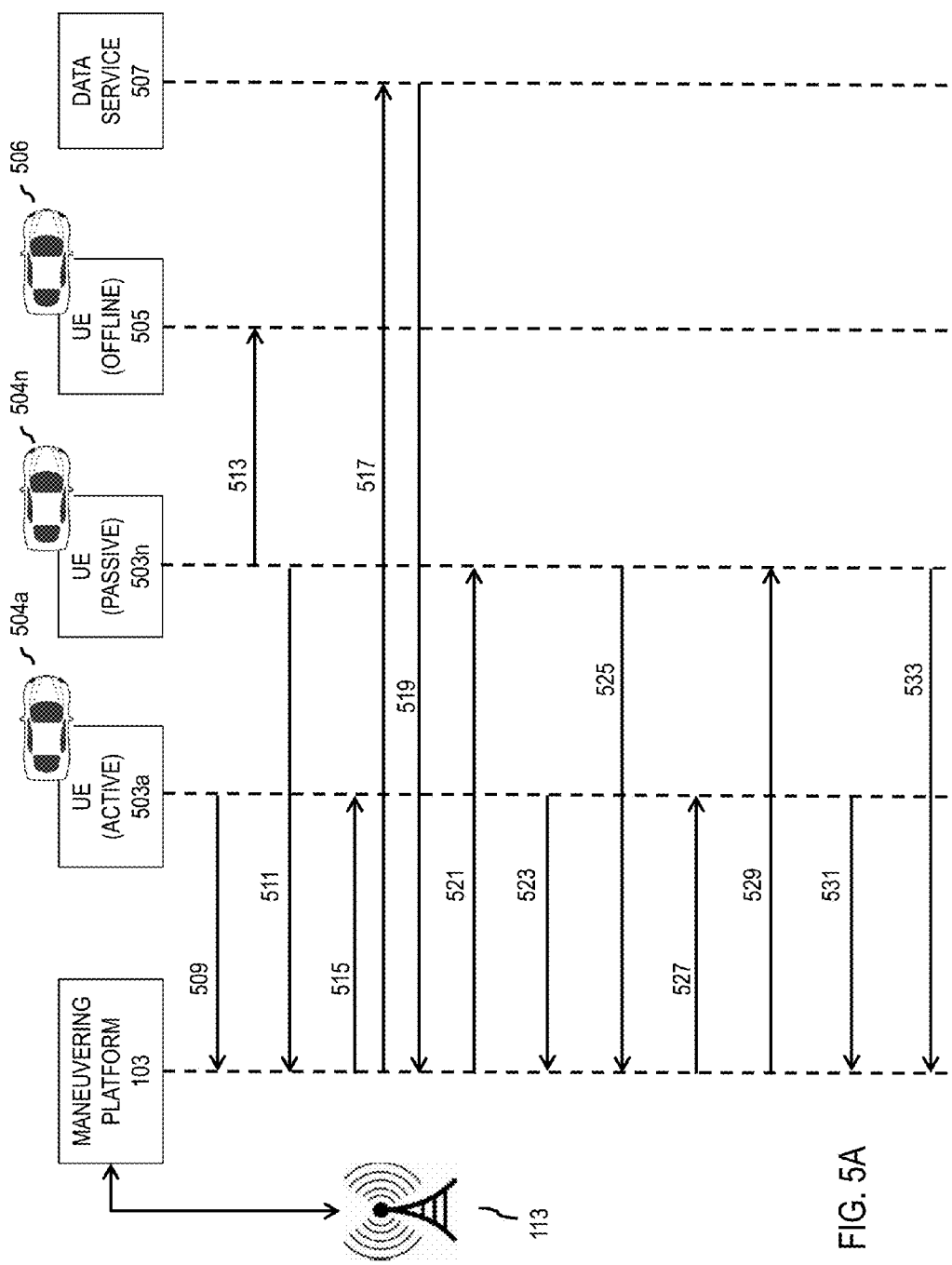
FIG. 5A is a sequence diagram for depicting the interaction between various components of the system of FIG. 1, according to one example embodiment.

FIG. 5A is a sequence diagram for depicting the interaction between various components of the system of FIG. 1, according to one embodiment. Per this example, the maneuvering platform 103 is configured to interact with a cellular tower 113 that provides wireless network coverage for a given region to connected wireless devices. Various user equipment (UE) 503a-503n and 505, i.e., identical to UE 101 of system 100 of FIG. 1, associated with respective vehicles 504a-504n and 506, are also configured to interact with the maneuvering platform 103 for receiving maneuver support during travel of the vehicles 504a-504n and 506. Under this scenario, the vehicles are located within the region of coverage of the cellular tower 113 and the respective UE 503a-503n and 505 have the appropriate subscriber access to the cellular tower 113 (cell). This corresponds to a scenario wherein the maneuvering platform 103 is the initiator of the maneuver plan execution.

The UE 503a-503n are able to establish a connection with the cell 113 as the vehicles 504a-504n travel within the cell's coverage area. Another vehicle 506 having associated UE 505 maintains an offline status, i.e., does not establish a connection with the cell 113 while it travels within the cell's coverage area. In steps 509 and 511, the connected UE 503a-503n engage in a register and identification procedure with the maneuver platform 103. This includes sharing location and/or contextual information associated with the vehicle or other vehicles (e.g., 504a-504n) the driver, the environment of travel, etc. In addition, the connected UE 503a-503n may also acquire and share location and/or contextual information regarding one or more vehicles or objects, such as a pedestrian or cyclist, they encounter during travel, according to step 513. This step corresponds to the monitoring of offline (not connected) UE 505 for corresponding vehicle 506. Under this scenario, the location and/or contextual information may include data for indicating the vehicle type, size, current speed and location, direction, trajectory, etc. The maneuvering platform 103 can therefore gather and process a wide array of information for determining and defining one or more roles for the vehicle 506 in order to calculate its one or more trajectories and monitor its movements. In addition, the gathered information may be further considered when calculating one or more maneuvers for one or more vehicles in one or more clusters. Per the connection, the UE 503a-503n constantly share information about their location and trajectory with the maneuvering platform 103.

Having shared their identity and location and/or contextual information, the maneuvering platform 103 is able to monitor the different UE 503a-503n as a group. Based on this information, the maneuvering platform 103 analyzes the information to detect an overlapping intent of respective vehicles 504a-504n. The maneuvering platform 103 then builds or assigns the vehicles 504a-504n to clusters for representing the similar intents. Still further, the maneuvering platform 103 computes maneuver plans (e.g., one or more coordinated maneuvers) for the cluster and assigns roles to each of the vehicles 504a-504n. These executions correspond to steps 515 and 521.

In this case, the vehicle 504a is established as having an active role while the vehicle 504n is established as having a passive role. It is also noted that the maneuvering platform 103 may access one or more third party data sources 507 (e.g., service 115 of FIG. 1), corresponding to steps 517 and 519. This may correspond to additional contextual information for use by the maneuvering platform 103 in generating the one or more maneuver plans or for determining cluster assignments.

In steps 523-525, the UE 503a-503n process the maneuver information as provided and signal acceptance of the maneuvers to the maneuvering platform 103. Alternatively, the UE 503a-503n may decline for a maneuver plan classified as "default." A maneuver plan presented/recommended to a vehicle however as "forced" or "urgent" may not be declined.

After the maneuvering platform 103 receives the acknowledgements from the accepting UE 503a-503n, the vehicles are instructed to execute the maneuvers according to plan, corresponding to steps 527 and 529. This may include, for example, initiating execution of a vehicular control or autonomous navigation system of a vehicle 504a-504n for performing the maneuver. In steps 531 and 533, the UE 503a-503n also signal to the maneuvering platform 103 that the maneuvers were performed and indicates successful completion of the maneuver plan to the other associated UE. The maneuvering platform 103 then adjusts the size, scope or existence of the cluster that executed the maneuver plan and returns the vehicle to an unmanaged state.

Figure 5B:
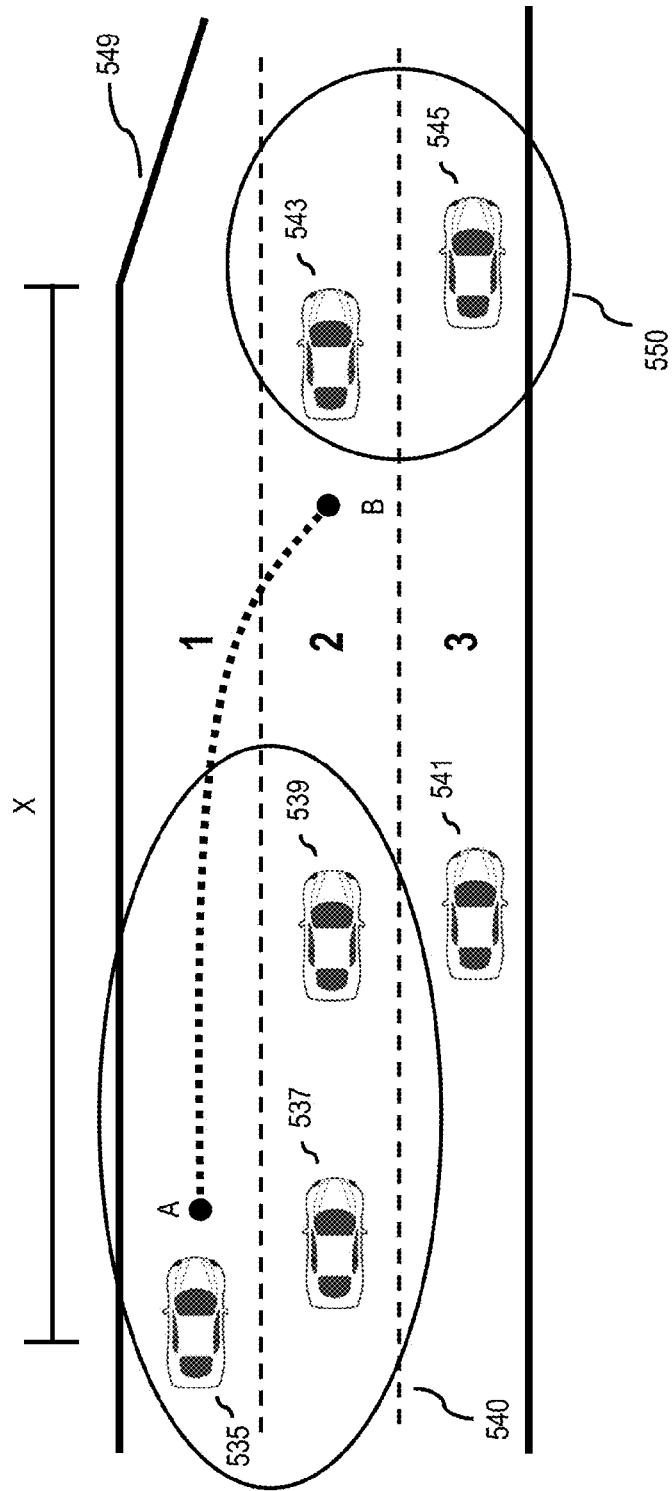
FIG. 5B is a diagram depicting one or more vehicles performing maneuvers according to a generated maneuver plan, according to various example embodiments.

FIG. 5B is a diagram depicting one or more vehicles performing maneuvers according to a generated maneuver plan, according to various embodiments. For the purpose of illustration, the vehicles 535-545 are autonomous and are directed by a control system capable of connecting with a wireless/cellular tower, a navigation service and various other third-party data sources by way of a communication network (e.g., network 105). The control system also employs various sensors for detecting/sensing data within the vehicle 535-545 as well as external phenomena. Under this scenario, the vehicles are within range of a cellular tower (cell) whose coverage area corresponds to a location of travel (e.g., roadway 534) of the vehicles 535-545. Also, the cell and control systems are already configured to operate in connection with the maneuvering platform 103 for supporting and augmenting the maneuverability of said vehicles 535-545.

As the vehicles 535-545 travel along a three lane roadway 549, their respective control systems are able to establish a connection with the local cell. In this case, all of the control systems of the vehicles establish a connection with the exception of vehicle 541, which remains unconnected. The connected vehicles 535-539 and 543-545 are therefore able to transmit location and/or contextual information to the maneuvering platform 103 for analysis. This includes, for example, data for identifying the control system/vehicle, the make, type and model of the vehicles along with dimension data, current location data and speed information, vehicle status information, etc.

Based on the location information, the maneuvering platform 103 determines the conditions and status of the connected vehicles 535-539 and 543-545, their relative proximities from one another, their speed and trajectories along the roadway 534, etc. Also, having retrieved routing information regarding at least vehicle 535, 539 and 545, the maneuvering platform 103 is able to identify a common destination or route of said vehicles. Based on the analysis results, the maneuvering platform 103 assigns the vehicles to respective clusters 540 and 550 as the vehicles exhibit similar behaviors, are executing similar actions or have the same driving requirements. In the case of vehicle 535, the maneuvering platform 103 is also able to determine the first lane (labeled 1) of the roadway 534 is to merge with the second lane (labeled 2) at a projected time of Y minutes given a distance X from the vehicle 535 to the merge point 549 of the roadway 534. This corresponds to a safety related scenario, wherein the ability of the vehicle 535 to handle the impending merge is based on the actions of the other vehicles 537 and 539 of the cluster 540.

Based on this determination, the maneuvering platform 103 assigns roles to all members of the cluster then computes a maneuver plan for all the cluster 540 members. The maneuvering platform 103 calculates the maneuvers to be performed based on the gathered location and/or contextual information. In addition, data sources for indicating various speed limits or traffic conditions related to the roadway 534 are also be accessed along with current traffic information. As such, the maneuvering platform 103 determines the appropriate window of time or space sufficient for the vehicle 535 to complete the maneuver relative to the position, speed, size and other characteristics of vehicles 537 and 535, the geometry of the road, etc.

Per this approach, the maneuvering platform 103 further specifies the designated maneuver path to be executed by each vehicle of the cluster 540. For example, in the case of vehicle 535, the maneuver path, depicted herein as line 560, starts at the current position of vehicle 535 and ends in a feasible target position (labelled B). Termination of the vehicle 535 at point B represents successful execution of the maneuver. In the case of vehicles 537 and 539, the maneuvering platform 103 may indicate vehicle 537 is to make a right turn from lane 2 and into lane 3 in order to make room for vehicle 535, while vehicle 539 is to remain course. Hence, the maneuver plan may specify multiple different actions to be executed concurrently or sequentially by the respective vehicles of the cluster 540. If permissible based on the maneuver type, the configuration space as determined enables all of the vehicles to abort the planned maneuver execution and return to their planned trajectory. This is possible from any point in the planned transition and corresponds to failed execution.

Once the maneuvers are calculated, the maneuvering platform 103 sends the control system of the cluster 540 information about its designated role in the maneuver plan along with the specific maneuvers to be executed. This information may be presented in the form a recommendation to be accepted or rejected by the control system. The vehicles can decline the maneuver request in the case where the assigned maneuver class is "default," but not when the class is designated as "forced" or "urgent." In this case, the control systems of respective vehicles 535-539 process the maneuver information and signal acceptance to the maneuvering platform 103 accordingly. Upon reception of all acknowledgments, the maneuvering platform 103 then instructs the cluster members to enter maneuver execution.

During maneuver execution, each vehicle is allowed to move freely within its assigned configuration space. As the maneuvers are executed, the control systems of the connected vehicles 535-539 continuously send status updates to the watchtower, including position, heading, speed, trajectory plan, sensor observations, etc. In the case of vehicle 539, sensor observations regarding unconnected vehicle 541 may also be submitted. As the updated information is received, the maneuvering platform 103 can send updated maneuver information, including a change in maneuver class and configuration space, while the maneuver is executed. This is triggered by unplanned events such as a vehicle leaving its assigned configuration space or detection of an obstacle through the cluster member's sensors.

By way of example, it may be detected that vehicle 543 is stalled (not moving), thus requiring that vehicle 539 slow down and turn into lane 3 to avoid the stall. Hence, the assigned configuration spaces for respective vehicles of the cluster 540 are adjusted in an appropriate way. For "default" maneuvers, this includes removing the option of successful completion and forcing all active control systems of the vehicles into aborting the planned maneuver. In the case of other maneuvers, the adjustment includes transitioning the control systems into a safe state, such as: a) adding an evasion maneuver for obstacles, b) emergency braking, c) changing the class of the maneuver to allow for more inconvenient trajectories, etc.

Once the maneuvers are performed successfully, the control systems of respective vehicles 535-539 signal successful termination of the maneuver to the maneuvering platform 103. The maneuvering platform then unassigns/removes the vehicle accordingly from the cluster. In the case where a maneuver is aborted, the control systems signals failed termination (failed completion) to the maneuvering platform 103 and unassigns/removes the vehicle accordingly from the cluster. It is noted that the adapting or unassigning of the vehicles 535-539 to the cluster may correspond to an updating of the database 107 for maintaining the cluster and vehicle assignments. Finally, the maneuvering platform 103 informs all passive control systems about the outcome of the maneuver and returns them all to an unmanaged state.

It is noted that the above described scenario corresponds to a group initiated event, wherein the maneuver is triggered based, at least in part, on the needs of the single vehicle 535 relative to its location and the other vehicles 537 and 539 travelling within the same location. Alternatively, the maneuver request may be have initiated solely by vehicle 535. Also, in other instances, the maneuvering platform 1203 may coordinate the execution of maneuver plans wherein multiple connected UE 101 (e.g., control systems) initiate the execution. For example, a synchronized lane change may be performed wherein several vehicles connected to a cell 113 for interacting with the maneuvering platform 103 request a lane change. The request may be made in response to cars entering a space along the roadway that is newly freed up as a result of another connected vehicle's lane change or as the result of the impending entry of a vehicle onto the roadway as it traverses an entrance ramp.

Still further, situational or initiator free execution of the maneuvering platform 103 may be invoked in response to environmental or traffic infrastructure conditions. Also, while described herein from the perspective of vehicles, it is noted that pedestrian maneuvering may also be accounted for by the maneuvering platform 103. Under this scenario, a pedestrian having a mobile device or network ready wearable device may connect with the cell 113 and interact with the maneuvering platform 103 accordingly. As such, clusters may feature one or more pedestrians or vehicles. The recommended one or more maneuvers may therefore be presented as recommendations for acceptance by the pedestrian in connection with the other members of the cluster.

The processes described herein for generating maneuver plans for one or more vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
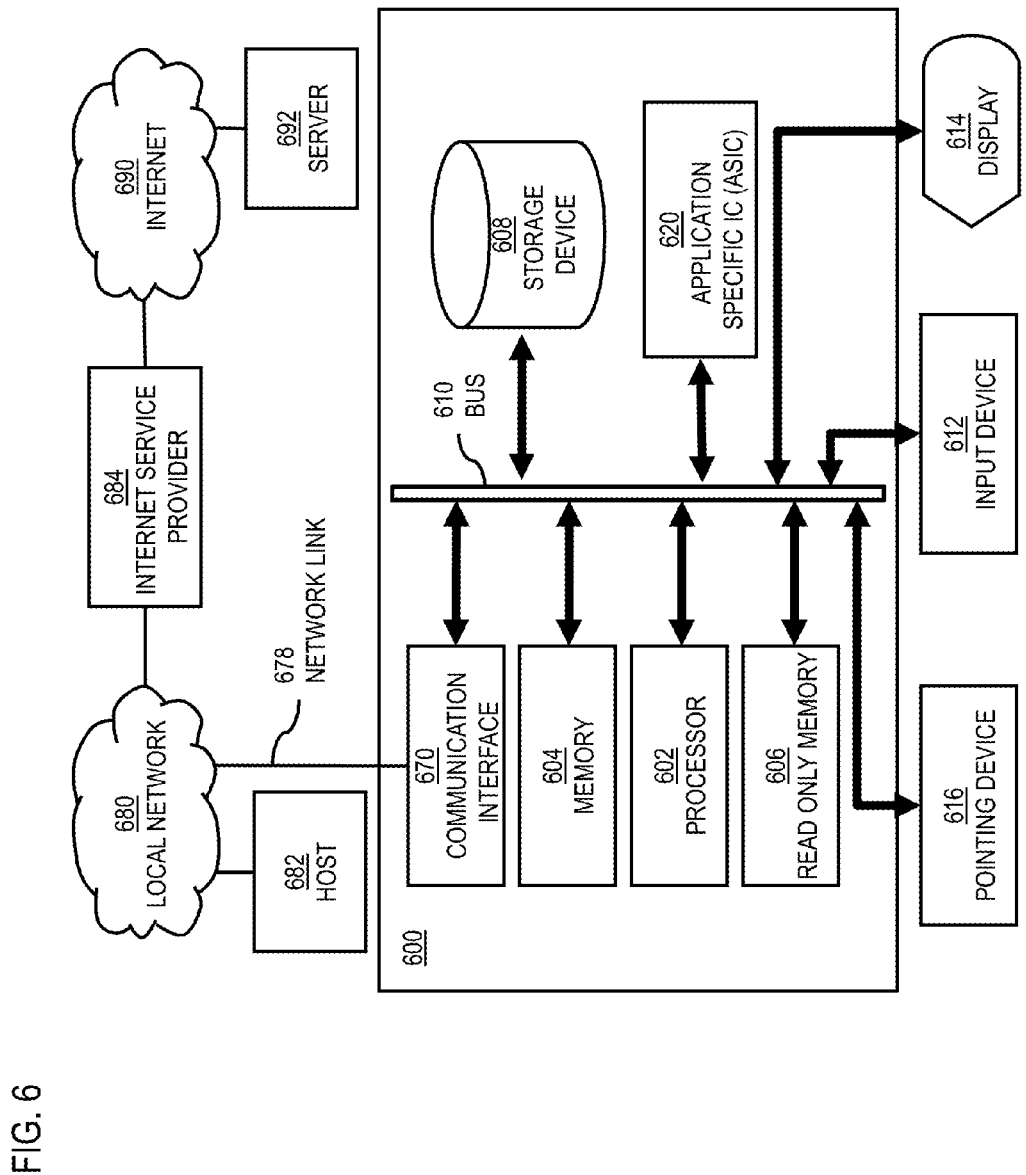
FIG. 6 is a diagram of hardware that can be used to implement an example embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate maneuver plans for one or more vehicles as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating maneuver plans for one or more vehicles.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate maneuver plans for one or more vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating maneuver plans for one or more vehicles. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating maneuver plans for one or more vehicles, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating maneuver plans for one or more vehicles to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate maneuver plans for one or more vehicles as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating maneuver plans for one or more vehicles.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate maneuver plans for one or more vehicles. The memory 705 also stores the data associated with or generated by the execution of the inventive steps.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating maneuver plans for one or more vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating maneuver plans for one or more vehicles. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate maneuver plans for one or more vehicles. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, by an apparatus, location information, context information, or a combination thereof of a plurality of vehicles carrying respective access nodes that communicate with a cell of a wireless communication network and subscribe to a provider of the cell;
   grouping, by the apparatus, the vehicles into one or more clusters based on a geographic coverage range of the cell, and one or more common locations of travel, one or more common driving and traffic conditions, one or more common safety requirements, or a combination thereof of the vehicles;
   calculating, by the apparatus, coordinated maneuvers to be performed per cluster by the vehicles based on navigation objectives of each vehicle of the respective cluster; and
   initiating, by the apparatus, a performance of the coordinated maneuvers by the vehicles.

2. The method of claim 1, further comprising:
   monitoring, by the apparatus, the location information, the context information, or a combination thereof of the vehicles;
   predicting based on the monitoring that one or more of the vehicles are traveling from the cell into one or more different cells; and
   initiating a transmission of information of the one or more clusters and the coordinated maneuvers to the one or more different cells, before the one or more of the vehicles traveling into one or more areas covered by the one or more different cells or before the one or more of the vehicles connecting to the one or more different cells,
   wherein the coordinated maneuvers are to be performed sequentially, concurrently, or a combination thereof within a window of time, a window of space, or a combination thereof for controlling the behavior of the vehicles, and
   wherein the apparatus is embedded in a node located within a cellular tower of the cell.

3. The method of claim 2, further comprising:
initiating a handover of the grouping and the calculating from the apparatus embedded in the node located within the cellular tower of the cell to one or more other apparatus embedded in one or more other nodes located within one or more other cellular towers of the one or more different cells, when the one or more of the vehicles travel into one or more areas covered by the one or more different cells or when the one or more of the vehicles connect to the one or more different cells;
processing traffic regulation information, driving regulation information, routing information, transportation infrastructure information, vehicle information, or a combination thereof associated with the location information, the context information, the current location of the vehicle, or a combination thereof to determine one or more requirements, one or more conditions, or a combination thereof associated with the vehicles, the current locations of travel, or a combination thereof; and
determining the sequence, the concurrency, the window of time, the window of space, an urgency of performance, or a combination thereof of the coordinated maneuvers to be performed by the vehicles based on the one or more requirements, the one or more conditions, or a combination thereof,
  wherein the calculation is based on the determined sequence, concurrency, window of time, window of space, urgency of performance, or a combination thereof and the current location of travel is associated with one or more location points, one or more points of interest, one or more roadway segments, one or more lanes, one or more intersections, or a combination thereof.

4. The method of claim 1, further comprising:
determining that the communication link is established between the access node and the cell; and
processing the location information, the context information, or a combination thereof associated with the vehicles as transmitted via the communication link to determine whether the vehicles share (a) one or more current or intended maneuvers to be performed by the vehicles, (b) current or intended destinations of the vehicles, (c) the one or more clusters associated with the cell in common, or (d) a combination thereof,
  wherein the assignment is further based on the sharing, and
    wherein the apparatus is embedded in a server and communicates with the access nodes travelling with the vehicles via a cellular tower of the cell.

5. The method of claim 4, further comprising:
determining a role of each of the vehicles assigned to the one or more clusters based on the sharing,
  wherein the role indicates a participation level, a priority, a status, or a combination thereof of the vehicles for performing the coordinated maneuvers, and the access nodes include one or more mobile devices, one or more navigation systems, one or more control systems, or a combination thereof, of the vehicles.

6. The method of claim 4, further comprising:
determining no sharing in common exists; and
generating a new cluster based on the determination,
wherein the assignment is based on the new cluster.

7. The method of claim 1, further comprising:
processing updated location information, context information, or a combination thereof associated with the vehicles based on the performance of the coordinated maneuvers to determine a status for indicating (a) a completion or failure of performance of the coordinated maneuvers, (b) whether the cell is still associated with the current region of travel of the vehicles, (c) a change in a role associated with the vehicles, or a combination thereof, or (d) a combination thereof,
  wherein the apparatus is embedded in one of the access nodes travelling with the vehicles.

8. The method of claim 7, further comprising:
calculating (a) an adjustment to a number of vehicles assigned to the one or more clusters, (b) one or more maneuvers to be performed by the vehicles, or a combination thereof in association with a different cell of the wireless communication network, or (c) a combination thereof based on the status,
  wherein the one or more maneuvers to be performed by the vehicles in association with the different cell are indicated to the different cell by the cell based on a handover procedure, the communication link between the access nodes and the cell, or a combination thereof.

9. The method of claim 7, further comprising:
unassigning the vehicles from the one or more clusters based on the status,
  wherein the vehicles include one or more manually powered vehicles, one or more driver operated motorized vehicles, one or more autonomous vehicles, or a combination thereof.

10. The method of claim 1, wherein the location information, the context information, or a combination thereof includes global positioning data, motion data, trajectory data, orientation data, routing data, roadway data, environmental data, traffic data, event data, vehicle status data, identification data, capability data, or a combination thereof,
  wherein at least one of the vehicles is assigned to more than one of the clusters, and
  wherein the assignment is further based on a shared path, route, destination, or a combination thereof, of the vehicles.

11. An apparatus comprising:
at least one processor; and
at least one memory including computer program code for one or more programs,
the at least one memory and the computer program code configured to, with the at least one processor, cause the apparatus to perform at least the following,
  process location information, context information, or a combination thereof of a plurality of vehicles carrying respective access nodes that communicate with a cell of a wireless communication network and subscribe to a provider of the cell;
  group the vehicles into one or more clusters based on a geographic coverage range of the cell, and one or more common locations of travel, one or more common driving and traffic conditions, one or more common safety requirements, or a combination thereof of the vehicles;
  calculate coordinated maneuvers to be performed per cluster by the vehicles based on navigation objectives of each vehicle of the respective cluster; and
  initiate a performance of the coordinated maneuvers by the vehicles.

12. The apparatus of claim 11, wherein the coordinated maneuvers are to be performed sequentially, concurrently, or a combination thereof within a window of time, a window of space, or a combination thereof for controlling the behavior of the vehicles.

13. The apparatus of claim 12, wherein the apparatus is further caused to:
process traffic regulation information, driving regulation information, routing information, transportation infrastructure information, vehicle information, or a combination thereof associated with the location information, the context information, the current location of the vehicle, or a combination thereof to determine one or more requirements, one or more conditions, or a combination thereof associated with the vehicles, the current location of travel, or a combination thereof; and
determine the sequence, the concurrency, the window of time, the window of space, an urgency of performance, or a combination thereof of the coordinated maneuvers to be performed by the vehicle, the one or more other vehicles, or a combination thereof based on the one or more requirements, the one or more conditions, or a combination thereof,
wherein the calculation is based on the determined sequence, concurrency, window of time, window of space, urgency of performance, or a combination thereof and the current location of travel is associated with one or more location points, one or more points of interest, one or more roadway segments, one or more lanes, one or more intersections, or a combination thereof.

14. The apparatus of claim 11, wherein the apparatus is further caused to:
determine that the communication link is established between the access node and the cell; and
process the location information, the context information, or a combination thereof associated with the vehicles as transmitted via the communication link to determine whether the vehicles share (a) one or more current or intended maneuvers to be performed by the vehicles, (b) current or intended destinations of the vehicles, (c) the one or more clusters associated with the cell in common, or (d) a combination thereof,
wherein the assignment is further based on the sharing.

15. The apparatus of claim 14, wherein the apparatus is further caused to:
determine a role of each of the vehicles assigned to the one or more clusters based on the sharing,
wherein the role indicates a participation level, a priority, a status, or a combination thereof of the vehicles for performing the coordinated maneuvers, and the access nodes include one or more mobile devices, one or more navigation systems, one or more control systems, or a combination thereof, of the vehicles.

16. The apparatus of claim 14, wherein the apparatus is further caused to:
determine no sharing in common exists; and
generate a new cluster based on the determination,
wherein the assignment is based on the new cluster.

17. The apparatus of claim 11, wherein the apparatus is further caused to:
process updated location information, context information, or a combination thereof associated with the vehicles based on the performance of the coordinated maneuvers to determine a status for indicating (a) a completion or failure of performance of the coordinated maneuvers, (b) whether the cell is still associated with the current region of travel of the vehicles, (c) a change in a role associated with the vehicles, or a combination thereof, or (d) a combination thereof.

18. A non-transitory computer-readable storage medium carrying one or more sequences of one or more instructions which, when executed by one or more processors, cause an apparatus to perform:
processing location information, context information, or a combination thereof of a plurality of vehicles carrying respective access nodes that communicate with a cell of a wireless communication network and subscribe to a provider of the cell;
grouping the vehicles into one or more clusters based on a geographic coverage range of the cell, and one or more common locations of travel, one or more common driving and traffic conditions, one or more common safety requirements, or a combination thereof of the vehicles;
calculating coordinated maneuvers to be performed per cluster by the vehicles based on navigation objectives of each vehicle of the respective cluster; and
initiating a performance of the coordinated maneuvers by the vehicles.

19. The non-transitory computer-readable storage medium of claim 18, wherein the coordinated maneuvers are to be performed sequentially, concurrently, or a combination thereof within a window of time, a window of space, or a combination thereof for controlling the behavior of the vehicles.

20. The non-transitory computer-readable storage medium of claim 19, wherein the apparatus is further caused to perform:
processing traffic regulation information, driving regulation information, routing information, transportation infrastructure information, vehicle information, or a combination thereof associated with the location information, the context information, the current location of the vehicle, or a combination thereof to determine one or more requirements, one or more conditions, or a combination thereof associated with the vehicles, the current location of travel, or a combination thereof; and
determining the sequence, the concurrency, the window of time, the window of space, an urgency of performance, or a combination thereof of the coordinated maneuvers to be performed by the vehicles based on the one or more requirements, the one or more conditions, or a combination thereof,
wherein the calculation is based on the determined sequence, concurrency, window of time, window of space, urgency of performance, or a combination thereof and the current location of travel is associated with one or more location points, one or more points of interest, one or more roadway segments, one or more lanes, one or more intersections, or a combination thereof.

* * * * *